United States Patent
Kühn

(10) Patent No.: US 6,848,109 B1
(45) Date of Patent: Jan. 25, 2005

(54) COORDINATION SYSTEM

(76) Inventor: Eva Kühn, Prinz-Eugen-Strasse 28/27, A-1040 Vienna (AT)

(*) Notice: Subject to any disclaimer, the term of this patent is extended or adjusted under 35 U.S.C. 154(b) by 0 days.

(21) Appl. No.: 09/269,485
(22) PCT Filed: Sep. 24, 1997
(86) PCT No.: PCT/AT97/00209
§ 371 (c)(1), (2), (4) Date: Mar. 29, 1999
(87) PCT Pub. No.: WO98/14870
PCT Pub. Date: Apr. 9, 1998

(30) Foreign Application Priority Data

Sep. 30, 1996 (AT) ................................ GM573/96 U

(51) Int. Cl.[7] ............................................. G06F 9/44
(52) U.S. Cl. ................................ 719/315; 718/101
(58) Field of Search ............................. 719/315, 313; 718/101; 707/8, 10, 202, 203; 709/315

(56) References Cited

U.S. PATENT DOCUMENTS

| 5,381,534 A | 1/1995 | Shi ........................... 395/200 |
| 5,555,427 A | 9/1996 | Aoe et al. .................. 395/800 |
| 5,590,334 A | 12/1996 | Saulpaugh et al. ......... 395/683 |
| 5,596,750 A | 1/1997 | Li et al. ..................... 395/671 |
| 5,734,898 A * | 3/1998 | He ............................. 707/203 |

FOREIGN PATENT DOCUMENTS

| EP | 0772136 | 5/1997 |
| WO | WO 9710547 | 3/1997 |

OTHER PUBLICATIONS eva Kuhn, "Fault–Tolerance for Communicating Multidatabase Transactions," 1994, p. 1–10.*

Alexanger Forst, eva Kuhn, Herbert Pohlai and Konrad Schwarz, "Logic Based and Imperative Coordination Languages," 1994.* eve Kuhn, "A Distributed and Recoverable Linda Implementation with Prolog&Co".*

(List continued on next page.)

Primary Examiner—Meng-Al T. An
Assistant Examiner—Li Zhen
(74) Attorney, Agent, or Firm—Ladas & Parry LLP

(57) ABSTRACT

A peer-to-peer coordination system of distributed programs, services, and data is provided in a computer network where coordination servers run and serves local software systems. Some shared objects are communication objects to exchange messages and transactions. Only processes in reference to a communication object (administrated by replication strategies) are granted access via the local coordination server. The local software systems are capable of controlling transactions; creating, reading, and writing of communication objects; creating and supervising uniquely identified processes. Coordination servers have identical basic functionality for distributed object, transaction and process management, and taken together, form a global operating system. The network operates like a single global super computer and new processes and sites are dynamically added. The updateable objects has a non-resettable logical time stamp, is capable of storing data, and are coordinated by an optimistic concurrency control without utilizing explicit locks on the objects. The updateable object data is writeable on distributed peer nodes.

9 Claims, 32 Drawing Sheets

OTHER PUBLICATIONS

Eva Kuhn, "Fault–Tolerance for Communicating Multidatabase Transactions", Proceedings of the Twenty–Seventh Hawaii International Conference on System Sciences, vol. II: Software Technology ((Cat. No. 94TH0607–2), Proceedings of the Twenty–Seventh Hawaii International Conference on System Sciences, Wailea, HI, USA, 1994.

Eva Kuhn, Ahmed K. Elmagarmid, Noureddine Boudriga, "A Parallel Logic for Transaction Specification in Multidatabase Systems", International Journal of Systems Integration, vol. 1–35 (1995).

Alexander Forst, Eva Kuhn, Herbert Pohlai, Konrad Schwarz, "Logic Based and Imperative Coordination Languages", In the Proceedings of the PDCS'94 Seventh International Conference on Parallel and Distributed Computing Systems, ISCA, IEEE, Las Vegas, Nevada, Oct. 6–8, 1994.

Eva Kuhn, "Fault–Tolerance for Communicating Multidatabase Transactions", Proceedings of the Twenty–Seventh Hawaii International Conference on System Sciences, (HICSS), ACM, IEEE, Jan. 4–7, Wailea, Maui, Hawaii, 1994.

Alexander Forst, Eva Kuhn, Omran Bukhres, "General Purpose Work Flow Languages", International Journal on Parallel and Distributed Databases, special issue on Software Support for Workflow Management, Kluwer Academic Publishers, vol. 3, No. 2, Apr. 1995.

* cited by examiner

COORDINATION SYSTEM

FIELD OF INVENTION

This application relates generally to a coordination system of programs and more particularly to a peer-to-peer coordination system of distributed programs.

BACKGROUND OF THE INVENTION

The invention refers to a system for the coordination of distributed programs, services and data by using application programs in a network of computers where coordination servers are running which serve local software systems, where shared objects are used as communication objects to exchange messages and transactions are used to realize communication, and where the communication objects are uniquely identified by object identification numbers and only processes possessing a reference to a communication object are granted access to it via the corresponding local coordination server.

Objects generally refer to separate segments which may contain data as well as certain behaviours and communicate or cooperate, respectively, with the environment by exchanging messages. In particular, the environment means other objects. For example, clients (records), or bills and checks may form objects. Transaction on the other hand means a group of actions which usually must have certain properties, i.e. atomicity, consistency, isolation, and durability. The results of transactions must be protected against failures of any kind. In the literature, these properties are referred to as ACID-properties, and, in practice, they are of particular importance for database accesses, particularly if parallel and coordinated changes of different entries are to be effected. If in such a case a transaction can not be completed, this might result in an inconsistent database state. Therefore, it is essential that such a transaction is either fully completed or not at all (atomicity).

The rapid development of networking technologies, which has also resulted in the worldwide introduction of the Internet, brings about more and more application domains, such as for example the development of programs through coordination of program components and resources distributed in a network, instead of the development of sequential programs, or the purchase of services in a network. The necessary software support must ensure a high degree of reliability and availability.

In known systems (e.g. EP 574 303 A or U.S. Pat. No. 5,555,427 A), primarily, so called message passing is used i.e. messages are exchanged for the communication and synchronization of parallel running activities. For example, many known systems use special calls, so-called RPC calls (remote procedure calls), to call a function in another computer in the network —using parameter passing etc., like calling a local function. This form of exchanging messages for communication and synchronization, however, has certain disadvantages. E.g., it is necessary to consider the underlying hardware architectures, and usually, the adaptation of application programs to new hardware environments or new application requirements concerning efficiency, reliability and availability will require a modification of the program source code. In addition, these architectures called client/server architectures in the literature (e.g. U.S. Pat. No. 5,381,534 A), do not relieve the programmer of either the synchronization of concurrent data accesses or of the replication of data. Programs that are developed by means of such systems naturally have a hierarchical structure and break up into client components and server components, both of which have to be implemented by the programmer, in large applications this hierarchical structure leads to performance problems.

Alternative approaches to the exchange of message are based on the use of shared data (objects) for the communication and synchronization of parallel running, distributed processes. The advantage of this approach is that it offers with the same expressive power, a conceptually higher abstraction of the underlying hardware. Programs based on this paradigm may be shorter and better to maintain. Moreover, systems offering shared data, may relieve the program developer by the implementation of their server component.

As a rule, however, conventional approaches based on shared data have several of the following disadvantages:

(a) Global names are used for the objects. With huge amounts of data-this quickly leads to naming conflicts and renders automatic garbage collection of objects impossible.

(b) The administration of objects is not reliable.

(c) The approach can not be integrated into any programming language, i.e., it may only be available in the form of a new programming language.

(d) Atomicity of several communication steps is not supported.

(e) Usually, transactions are not supported. The few exceptional cases support only the classical transactions, which is not sufficient for the coordination of distributed systems. An early (not isolated) commitment of subtransactions is not possible, which means that intermediate results of cooperating transactions cannot be made visible and locks in local systems; cannot be relaxed early particularly, these two properties, however, would be essential to the autonomy of local systems. Other desirable properties in the context of transactions are semantic compensation (necessary to guarantee atomicity in spite of relaxation of the isolation property of transactions) and function replication, providing the possibility to replace subtransactions by other ones in case of failure.

(f) Only one technique is offered to administrate the consistent view of the virtually shared object space on the distributed hardware. Therefore, the programmer depends on the system concerning the achievement of fault-tolerance and concerning performance possibilities.

(g) Offers of services realized by means of the shared data are not supported. A user-specific differentiation would be particularly desirable.

(h) The removal of data no longer needed is not supported automatically.

(i) There is no access control: Anybody who guesses the name of an object will get access to it.

(j) There is no possibility to support recovery of U, computations on objects after system failures.

(k) The behavior of the system is unspecified and all data are lost, respectively, in case of a partial failure, i.e., if, for example, only one of the participating distributed computers crashes, and, the data on its hard disk are destroyed.

The articles "Fault-Tolerance for Communicating Multi-Database Transactions", eva Kuehn, Proceedings of the 27th Hawaii International Conference on System Sciences, ACM, IEEE, Januar 4–7, Hawaii, 1994, pp. 323–332; "General Purpose Work Flow Languages"., Alexander Forst, eva Kuehn and Omran Bukhres, International Journal on Parallel and Distributed Databases, Software Support for Work Flow Management, Kluwer Academic Publishers, Vol.3, No.2, April 1995, pp. 187–218;"Logic Based and Imperative Coordination Languages", Alexander Forst, eva Kuehn, Herbert Pohlai and Konrad Schwarz, Proceedings of the PDCS' 94, Seventh International Conference on Parallel and Distributed Computing Systems, ISCA, IEEE, Las Vegas, Nev., Oct. 6–8, 1994, pp. 1520–159; and "A Parallel Logic Language for Transaction Specification in Multidatabase Systems", eva Kuehn, Ahmed K. Elmagarmid, Yungho Leu, Noureddine Boudriga, International Journal of Systems Integration, Vol.5, 1995, Kluwer Academic Publishers, Boston, pp. 219–252, contain ideas for improved solutions, such as, particularly the use of local coordination servers servicing local software systems and managing the transactions for the realization of communication between objects. In this context, several procedures are called for which are language-independent or can be embedded into any programming language, e.g. to start, terminate or abort transactions. In addition, a general replication strategy is mentioned wherein each location accessing the communication object receives its own copy while distinguishing a copy as the main or primary copy from the other, i.e. secondary copies. Such primary copy is created, when a communication object is created. If this communication object is sent to another location, a secondary copy is created and sent to the remote coordination server. Thus, a tree structure is formed wherein each node knows all nodes to which a copy has been sent, and wherein each node (son) knows its ancestor (father) where the copy came from. At the root of the tree there is the primary copy of the communication object.

These hints in the above mentioned articles point in the right direction, but they do not yet allow a practical realization of the coordination of distributed software systems, service or data. These approaches particularly address the above mentioned disadvantages (a) to (e), but they do not give a solution for problems (f) to (k). Of these problems, problem (f) is of particular importance, because the argument that only optimal performance can only be achieved by low-level message passing or client/server oriented architectures—which, however, require more and more complicated implementation efforts — is the main reason why so far approaches based on shared objects did not achieve a break-through.

SUMMARY OF THE INVENTION

Therefore, the object of the present invention is to provide a new system of the above mentioned kind, which makes the realization of robust distributed applications, such as for example so-called business process modeling systems (work flow management systems), systems for distributed cooperative work (CSCW), multi database systems, distributed hypertext systems, etc., simpler and more reliable, avoiding above mentioned disadvantages of prior art approaches by special transaction mechanisms at the communication layer and the choice between several distribution strategies.

The system according to the present invention as described above is characterized in that all coordination servers together form a global operating system, the local software systems are at least extended by functions for transaction control, creation and blocking or non-blocking reading of communication objects, specification of transactional predicates and creation and control of uniquely identified processes authorized to access passed communication objects, and the communication objects are administrated by means of replication-based, selectable distribution strategies on which the application programs do not depend.

With such a system and with the coordination paradigm thus realized, a convenient alternative to conventional client/server architectures is obtained, achieving numerous advantages, as described hereinafter.

By all coordination servers behaving as a worldwide, uniform operating system —where all coordination servers are identical, the advantage gained inter alia that a unique treatment is guaranteed, that the number and location of the computers—or agents —is irrelevant (the system provides a specific network), and that in case of lost objects at least those parts which are independent of lost objects can be repaired or be saved as a consistent unit. Moreover, the global operating system will make program development much easier. The developer does not have to program synchronization and data replication. Programs get simpler, shorter and thus to easier to maintain.

In the present system, global object names are avoided —in its argument list receives each process the object identification numbers of all foreign objects it may see, and it is only allowed to access via these object identification numbers; on the other hand, in distributed systems certain objects have to be addressable due to their name (e.g., WWW Browsers, etc.) and this is also possible with the present system. In the closed coordination server world only object identification numbers are used, and they can, for example, be exported to the outside world via known or available supporting means returning a reference (and access permission) to an object by means of database related methods, and which, for the sake of simplicity, are herein referred to as "name servers". These name servers can be realized at application level, by basing them on existing techniques by means of known database technologies, and a user-tailored password check or an accounting and indexing mechanism, etc. going beyond the coordination server mechanism may be added. The technical realization makes use of the feature of permanent servers that an interminable process runs as an autonomous and automatically recoverable process, the argument of which contains the starting-point to the list of all names/objects used. This process must not terminate. It exports the desired object identification number to the requestors who specify the name of the object identification number and whose retrieval is performed as a process at this very server. Thus, any domains of name servers can be implemented which controllably administrate global names in restricted domains.

The security problem is solved sufficiently, by allowing access only to processes that legally possess an object identification number which either has been passed to them, or was created by them, or was obtained legally via a name server. Thus, additional data security is guaranteed beyond the mechanisms of the operating system—that are also observed by the coordination server model.

A further advantage of the solution according to the present invention is that the support of the specification of services and the export of these services to certain users and groups. This is done during configuration of the (x/transient) servers where one may specify who is authorized to access the corresponding services.

An important new property is the support of on-commitment actions. Their essential advantage is that the programmer can atomically group computations and the writing of data. For example, it be modeled that a new worker must be started if a certain value is communicated. This property, which is also guaranteed in case of system and network failures if the chosen distribution-strategy is reliable, makes the development of fault-tolerant applications very easy. Moreover, it may be assumed that all necessary data are automatically recovered and that all autonomous processes not yet terminated will automatically be re-started.

The selectable distribution strategies (communication protocols) allow fine-tuning of reliability, availability, replication behavior and performance, respectively, of the communication objects according to the actual needs and objectives, e.g., through optionally selectable protocol flags like "reliable"/"unreliable". It is also possible that different distribution strategies are used simultaneously in one program for different, communication objects.

Moreover, write-once objects as well as updateable objects are supported that offer various advantages; this co-existence is not known of in any other system.

The extension and addition of functions of the local software systems, i.e., the extension of their languages to so-called coordination languages, not only allows communication with the global operating system when using conventional traditional programming languages (e.g., C, Prolog, Java, Fortran, . . . ) (not to mention the desired operations on these communication objects, transaction control on them, etc.), but also—via the global operating system—a translation between the different language paradigms so that the communication objects are language neutral (and can contain any kind of data); the global operating system also cares for the possibly necessary transformation between different data formats (e.g., 32 bit/ 64 bit data words) and endian types ("big"/"little"). Options to support these functionality extensions/additions are a "library approach" (where the desired functions are added to the programming language) and particularly the "embedding approach" (where the coordination properties are embedded, i.e., integrated into the programming language).

Thus, the invention provides a system or network, operating in a very specific way where, the distributed computers operate according to a common, global operating system in summary, the invention makes the coordination of software systems, services and resources considerably easier.

The selection of a basic strategy in combination with additional, optional strategy flags when choosing the desired distribution strategy has proven particularly useful according to the present invention. For the fine-tuning of the corresponding distribution strategy at least different additional strategy flags can be selected, preferably also one of several possible basic strategies.

Moreover, it is advantageous, if the local software systems are started by the responsible coordination server. It is possible to start the server as a permanent server only once; the server will remain on and may serve further functions, and it carries only one name, even in case of various users; it is also imaginable to start the server as a (x/-) transient server for each call separately (or on one computer at a certain time as the only server).

In order to avoid overloading the memory, it advantageous, if communication objects to which no locally running process has a reference any more, are automatically removed by the responsible coordination server or are explicitly freed. Thus, no longer needed communication objects are automatically cleared from the memory (so-called garbage collection) like a "cleaning up", so that memory space can be saved; this becomes possible by the use of the non-global object identification numbers, and it is supported by the fact that the local software systems are started by the coordination server. Thus the coordination server can easily detect when a process has terminated, and then decrement the reference counters of all objects owned by this process—i.e. all objects that are denoted by the object identification numbers that have been passed to the process, all objects the process has created, and all objects that are subobjects of objects accessable by the process. The deletion, of course, depends on the respective distribution strategy, which might delay the garbage collection until strategy-specific conditions are fulfilled.

With regard to an optimal use of possibilities and resources in a network, it is also an advantage, if the coordination servers, which as one entity, form a global operating system, distribute heterogeneous transactions or subtransactions to different computers.

Preferably, in case of updateable objects transactional reading of these objects is provided. This makes it possible to verify, at commitment time of the transaction, whether the read value is still valid.

Transactional predicates preferably include writing into an object, starting of a subtransaction, distribution of a part of a transaction to another site, specification of a compensation action or an on-commitment action. Other transactional predicates can be, for example, the testing of an object with regard to its (un)definedness, the reading of an updateable object or the removal of a transactional request. It is particularly advantageous, to start an on-commitment action as a new computation if it is certain that a respective transaction will commit.

In the context of transaction control, not only the start and abortion or cancellation of transactions as such can be supported, but also the commitment of a transaction in a form in which a transaction is automatically aborted if the commitment is not successful: in order to be able to repair transactions while keeping all transactional work done so far, it is advantageous to support, among the functions for transaction control, a programmable withdrawal (backtracking) of transactional operations, such as, for example, the reading or writing of communication objects, in the case of failure. The reason is that coordinating transactions, in contrast to classical transactions, may have a very long life-span, and by means of the described withdrawal property, for example; a transaction which has been running for a long period of time, e.g. several months, and which has consumed expensive system resources, but wherein a minor, unimportant operation or subtransaction was unsuccessful, may be repaired dynamically without having to give up the transaction work done so far. (In conventional solutions, an abortion would be unavoidable). For this purpose, a "weak" form of the commitment function, which does not automatically trigger the abortion of the transaction but returns information as to which transactional request was not completed successfully, can be used in combination with the dynamic withdrawal of transactional requests.

The invention will now be described in detail with reference to preferred embodiments which particularly relate to details of an embodiment of the invention which, at least for the time being, are considered particularly advantageous, which, however, are not to be construed as limiting the invention, and with reference to the figures wherein:

DETAILED DESCRIPTION

Figure 1:
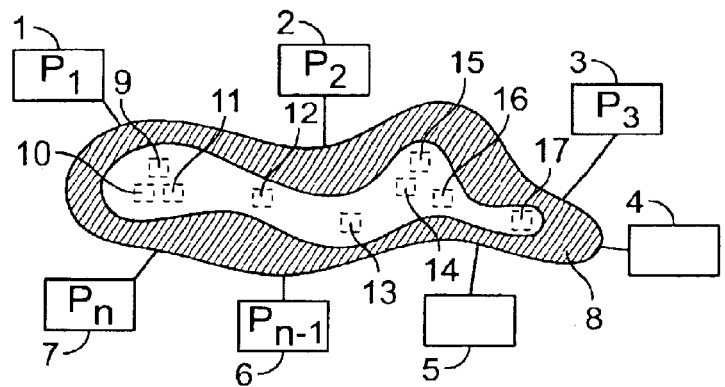
FIG. 1 is a principle scheme illustrating a system wherein communication objects are available for autonomous local software systems in a global space.

FIG. 1 schematically illustrates different autonomous software systems (local software systems—LSYS) 1 to 7 which can be based on different traditional programming languages P1, P2, P3, . . . , Pn-1, Pn (for example C, Prolog, Lisp, Pascal, Fortran, Cobol, C++, etc.). The autonomous software systems 1 to 7 may be represented by concurrent processes, and each of them can be regarded as a uniquely defined system written in such a programming language, particularly, systems 1 to 7 can each be a local software system, each based on another programming language, so that these systems 1 to 7 cannot cooperate directly. (Theoretically it is possible that two systems interact directly—for the sake of simplicity, however,—these directly interacting systems are, regarded as one single system here, and optionally more systems, e.g. three, may be grouped together too).

In FIG. 1, 8 denotes a so-called agent space, where the corresponding agents, which will be described below, provide the objects 9 to 17. In the present case, these objects 9 to 17 are e.g. write-once objects, optionally updateable objects, and they may be considered as units or containers for communication data; they represent communication objects contained in the shared object space accessible to the different local systems 1 to 7. Access to each communication object 9 to 17 is only possible via one of the agents.

A main task of the agents is to provide concurrent access to objects 9 to 17 in such a way that all participants authorized to see said objects 9 to 17 have the same consistent view of them at any time. This aspect is similar to a distributed database system offering transactions on data objects accessible to several participants.

The management of activities also includes the specification of tasks, i.e. of programs, which have to processed by certain software systems. A process request can be considered as a contract between the requesting software system and one of the agents, which is responsible for the task being executed by a certain (other) software system. The start of a computation is the beginning of a new interaction between the calling and the executing parties.

The objects should survive any kind of controllable failures in systems. Once occurred, certain situations must remain, because globally visible situations must not be cleared nor changed after other processes have seen them and have based their computations on them. It is necessary to be able to rely on communicated data. As soon as a write-once objects becomes a defined object (i.e., a non-empty container), it represents a certain constant value with high reliability. For example (in case of write-once objects), it can not be manipulated to contain other data at a later point of time.

Activities are implicitly synchronized, because if a system depends on the result of another system, it knows which object contains the data, and it can simply perform an access to them. If the data are not yet available, a system wanting to access them will simply nedd more access time.

For the above mentioned requirements, the following coordination "tools" described in detail hereinafter are provided in the present system, which enhance the single local systems and programming languages:

the communication objects form a reliable, abstract communication mechanism;

specific functions for transactions are provided; and special language constructs are provided to ensure parallelism and concurrency.

All parties participating in a communication have a consistent view of the data objects thus shared. Objects may be accessed as if they were present at the local site and embedded in the corresponding software system in such a way that they practically cannot be distinguished from local data. Upon proper embedding into the local software (which requires an enhancement of the software with regard to functions; examples for the extension of semantics of the basic functions of the software systems to allow operation on communication objects will be discussed below in greater detail), it will then be possible to communicate via these objects as communication media, with different software systems also being able to communicate via these communication objects, because from their point of view, these communication objects look like local objects. For the programmer this system looks like a globally available space, even though, in reality, it is distributed over a number of sites, comparable to a large distributed database. Each interactive process has its own window to this global space, but all processes have the same view on the object. If data are not yet available, a process must wait instead of operating with non-actual data. In such a local space a process will hold local data as usual. The data types in the local space and in the global space must of course be compatible.

The communication objects can be of any type, i.e. they may be assigned a value only once or they may be updateable like variables. Each process can rely on the data read from the global space, because (in case of write-once objects) they will not change, or they are recoverable, respectively. Moreover, the communication objects have a unique identification number, but no global name. These object identification numbers (OID) are suitable exported via the above mentioned name servers, which are realized at application level by means of known database technologies. The communication objects are shared between processes by passing them in arguments. A process having no reference to a communication object will not gain access to it. The agent maintaining the communication objects prevents processes from obtaining the reference to a communication object by trickery. This gives security, because only authorized processes are granted access to the data.

A communication object can be structured, and it can contain other communication objects as components. Such sub-communication objects are new containers for the communication, which may obtain values independently of the enclosing communication object. This will be illustrated below by means of an example (Example 1: producer-consumer problem) in greater detail.

In order to give to all processes shareing communication objects a consistent view, values can be written only within transactions into the globally shared space.

The present coordination system advantageously further allows function replication, relaxation of the isolation property of nested transactions, and semantic compensation.

The function replication is based on the necessity to replace a failed service by another one which is able to fulfill the same task in an equivalent way. Thus a complex task composed of a number of subtasks can be completed, even if a local system fails.

The relaxation of the isolation property is important for two reasons: Firstly, the principle of autonomy would be negatively effected to a substantial extent if a subtransaction during the coordination of local database systems would require locks in the local database system and holding these locks until the end of the global action. In particular, long-living or interminable processes (such as the producer-consumer process, cf. Example 1 below) would then become a serious problem. Therefore, subtransactions are allowed to terminate (in database technology: to commit) before the global process is terminated. On the other hand, working in cooperation requires that intermediate results become visible before the global process terminates. Subtasks cannot wait for data of other subtasks until the global process has terminated.

The semantic compensation is thus the logical consequence of the relaxation of the isolation property. For example, it may happen that, after successful completion, an action becomes unnecessary (e.g. due to function replication) or an action is withdrawn (if the global task finally fails). A committed transaction, however, must not be withdrawn, because other autonomous processes might already have seen its results and might have based their computations on them. If a process later decides, that a transaction is not needed, a semantic compensation must be provided for this case. A user-defined compensation action may be specified for this purpose, which will then be activated automatically and may write another communication object.

As the software systems to be coordinated already exist and run in parallel in many different places, parallelism in the system is crucial.

Parallelism between processes is essential for mutual coordination, and it may be provided by means of appropriate language extension, by which means a process can be created (at a remote site) and controlled, and by which means communication objects can be passed which are shared between the place of the caller and the place where the process is spawned. The site and the software system where the process shall be executed may be specified. The respective local site is assumed as such a priori, and the process is executed as a process (if possible, as a thread) of the system by which it was called. This, ensures sufficient parallelism between the processes. In principle, parallelism within one process is not necessary for the present coordination system, but parallelism between processes is a must.

The agents previously mentioned in the context of FIG. 1 mentioned agents are represented by local server processes called coordination servers. Wherever the present coordination system shall run, such a coordination server must exist which extends and services the corresponding local software system, as can be seen in the architecture scheme in FIG. 2.

According to FIG. 2, a coordination server 21, 22 and 23, respectively, is present at various locations or computer sites X, Y, Z in addition to the local software systems 18, 19, 20, which are extended by the enhancements described in greater detail below for the present coordination system (this is expressed by "& Co" attached to the corresponding programming languages $P_1, P_2, \ldots, P_{n-1}, P_n$; i.e. $P_1$ & Co, $P_2$ & Co, $\ldots, P_{n-1}$ & Co, $P_n$ & Co). These coordination servers 21, 22, 23 are the above mentioned "agents" (cf. hatching in FIGS. 1 and 2) and define the "agent space" in FIG. 1 discussed above and together they form a global operating system 24. For this purpose, the coordination servers ("CoKe"—"Coordination Kernel") 21, 22, 23 are build in the same way, and for building of the global operating system it is irrelevant how many coordination servers 21, 22, 23 are present in each single case. Due to this global operating system 24, it does not matter for the user whether a process runs locally or at a remote place; the identical coordination servers 21, 22, 23 show the same behavior, and this globality results in data abstraction; access to an object located at a remote site is like access to a local object—the user senses no difference and sees no messages in this respect.

Figure 2:
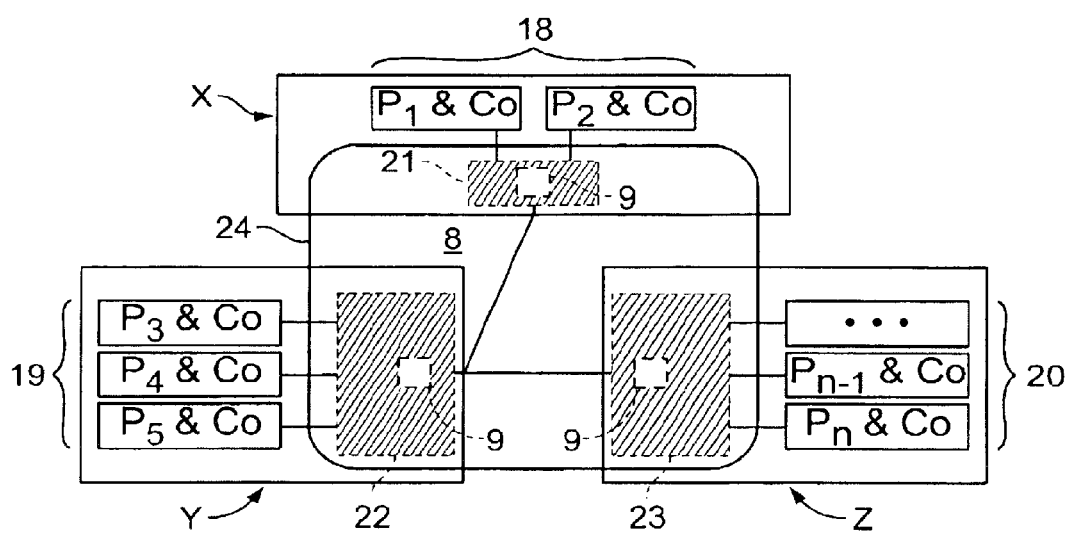
FIG. 2 is a scheme illustrating the fundamental architecture of a configuration of computers at different sites, where the coordination servers installed at each site together form a global operating system.

According to FIG. 2, for example, object 9 is created by agent (coordination server) 21 and then passed to agents 22 and 23. The agents serve as distributed "transaction managers". In general, each coordination server can be seen as including the modules (1) transaction manager; (2) process manager; (3) strategy manager; (4) recovery manager.

Figure 3:
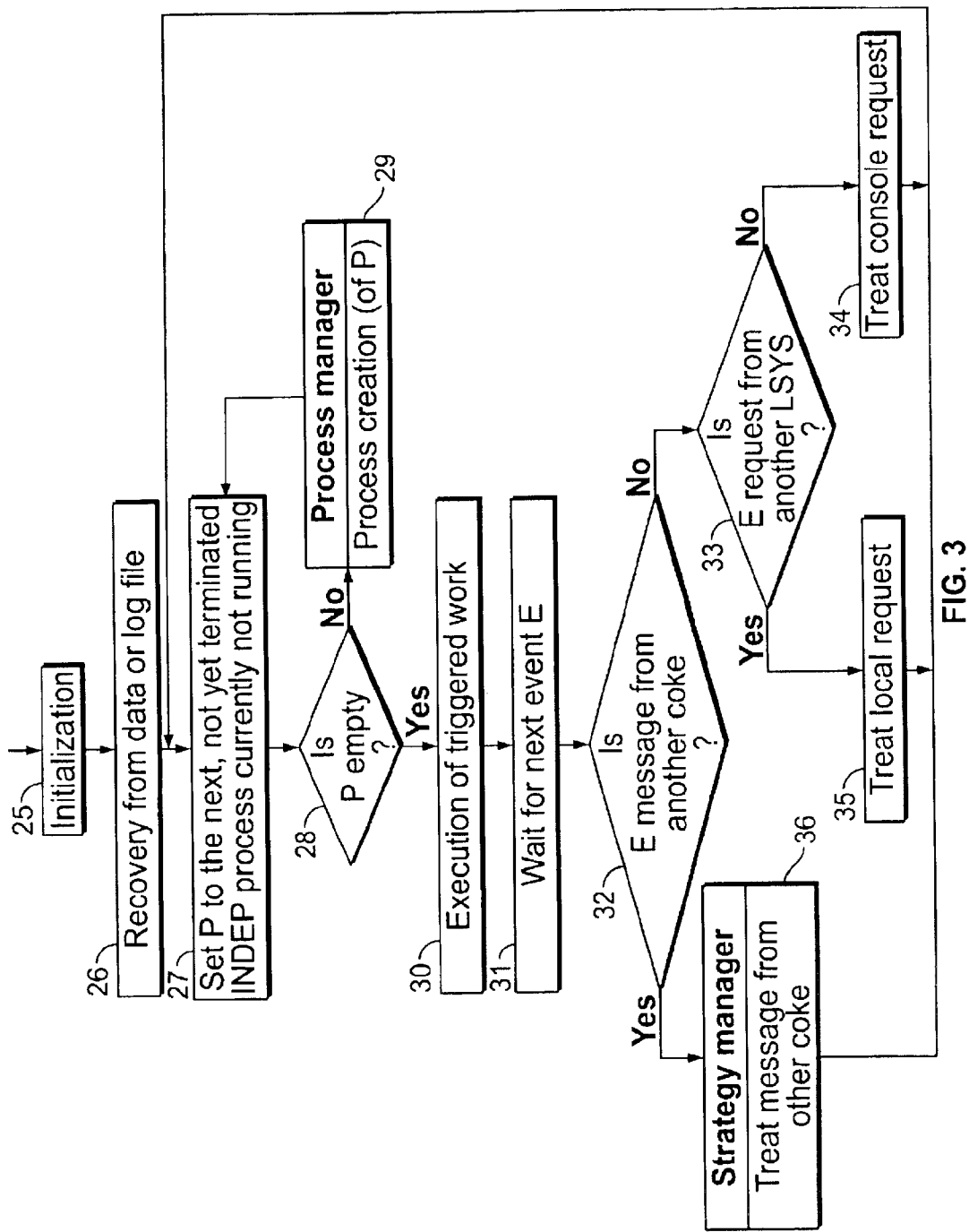
FIG. 3 is a logical control scheme illustrating the basic operation of the coordination server, and thus of the global operating system.
Figure 23:
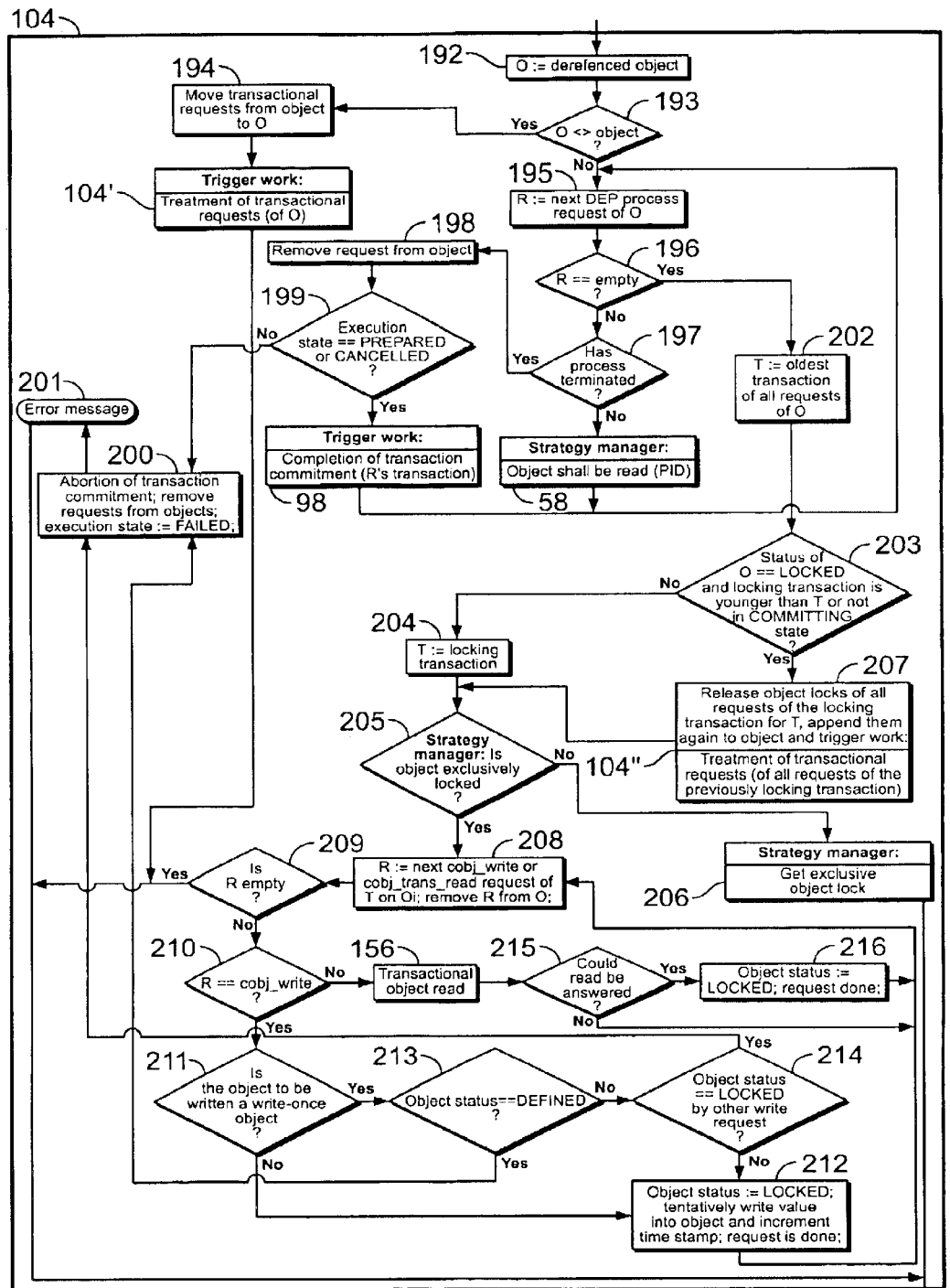
Figure 24:
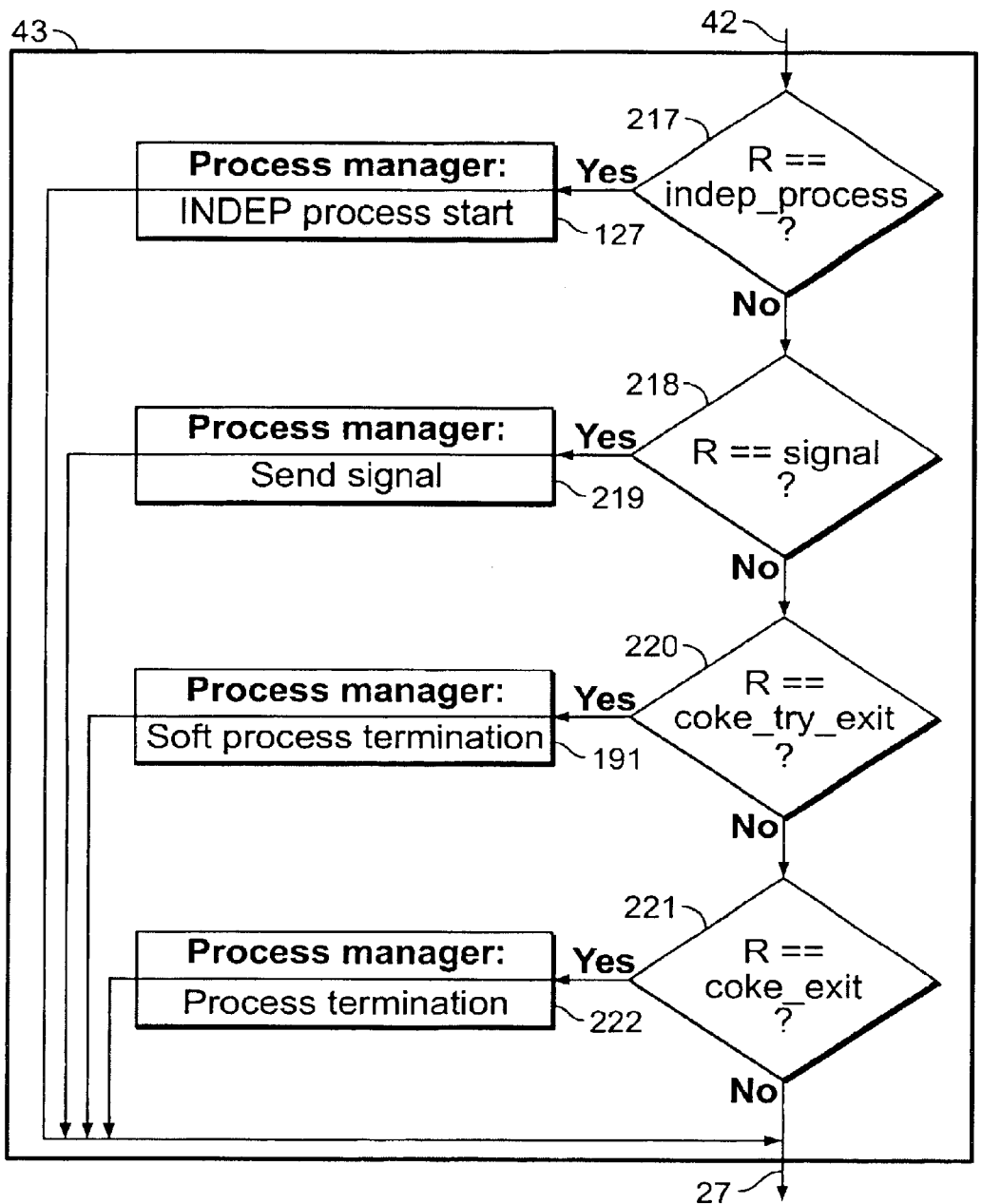
FIG. 24 shows the control for the process requests of FIG. 4, in greater detail.
Figure 25:
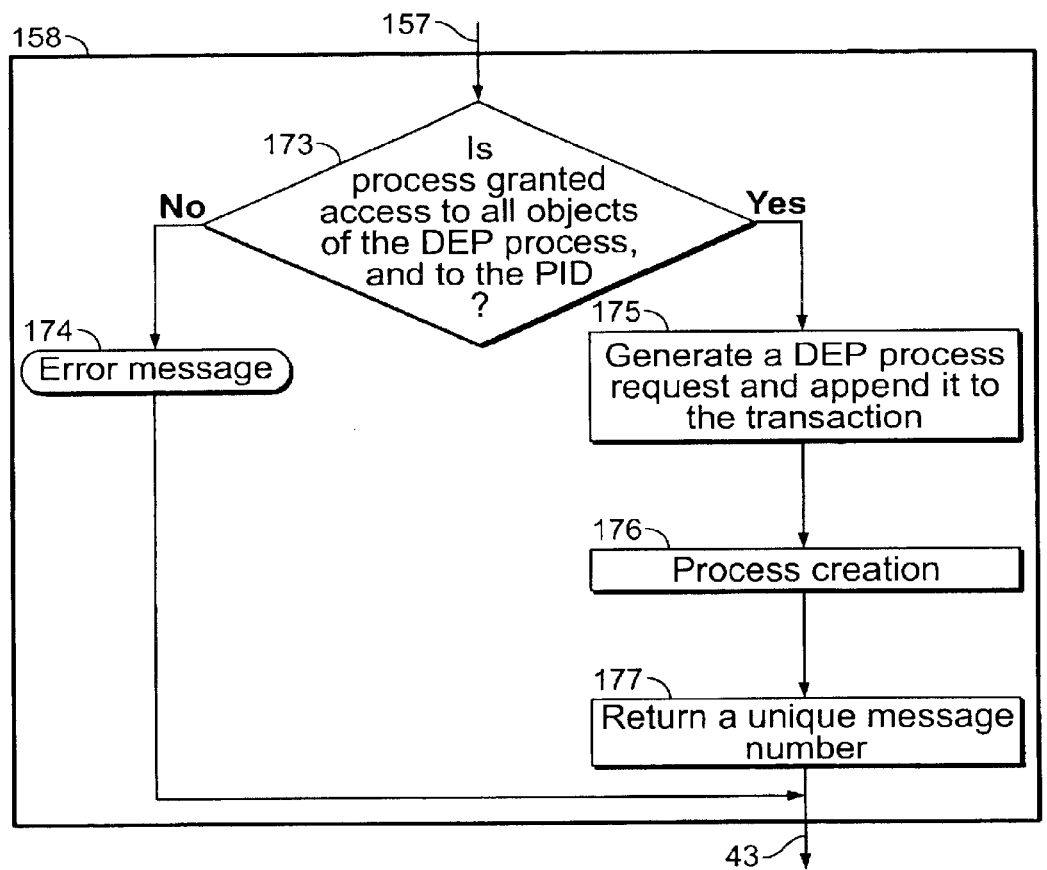
FIGS. 25 to 31 show the control flow of the corresponding processes-which together form the process manager.

Regarding its general function, the global operating system 24 is shown in FIG. 3 and, in greater detail with regard to transaction control, in greater detail with regard to transaction control, in FIGS. 4 to 9 in connection with FIGS. 10 to 23 (transaction manager); the process manager is apparent from FIG. 24 in connection with FIGS. 25 to 31, and the strategy manager (composed of single managers SMi for the corresponding distribution strategy) from FIGS. 32 to 40.

The recovery manager referred to in FIGS. 13, 14, 15, and 28, 30, and 32, contains the following essential elements:
atomic step START
atomic step END
atomic step ABORT Either all or none of the actions occurring between START and END are executed; i.e. in case of a system failure between START and END, no action will be executed.

Depending on the strategy used (by setting flags), the execution is reliable, i.e. effects are recorded (stored) into log and data files, or unreliable.

This procedure also applies to a nested call to START/END.

A call to "atomic step ABORT" will annul all effects.

FIG. 3 illustrates the main work flow, namely the main loop, of the present system, i.e. in the domain of the global operating system 24 or the corresponding coordination servers 21, 22, or 23, respectively, represented systematically in the form of a flow chart. As can be seen, after an initialization step 25, a recover step 26, where all data needed by the coordination server 21, 22, or 23 are recovered from the data file or the log file, and step 27, where an independent, not yet terminated, currently not active process P is defined, in step 28 it is asked whether the process list P is empty, i.e. whether no such process P was found. If this is not the case, the process manager is called, to—according to block 29—spawn the process P, whereafter the control returns to step 27. The spawning of a process is a subprogram illustrated below in greater detail by means of FIG. 31.

Figure 35:
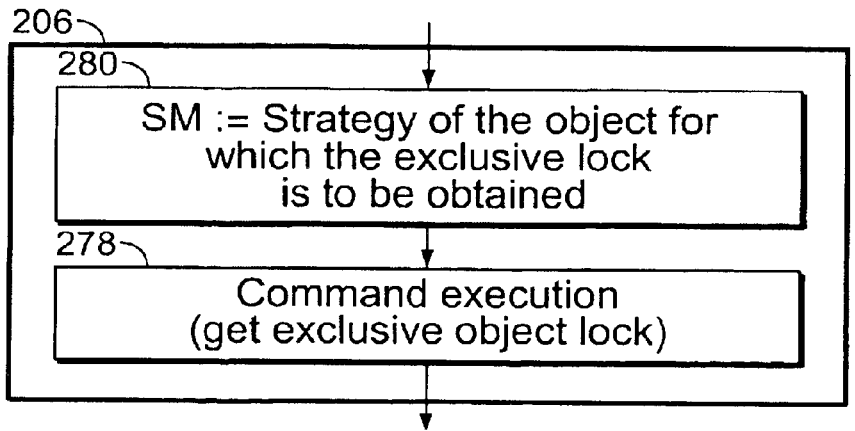

If the result of the query at 28 is positive, i.e. if no process P exists, in step 30 the execution of triggered work is passed, and in step 31 the next event E is waited for. In step 32 it is asked whether this event E is a message from another coordination server. If not, subsequently in 33 it is asked whether the event E is a request of a local software system; if not, the event E is treated in step 34 as a console request; if yes, the event E is treated as a local request, namely according a procedure as shown in FIG. 35, which is illustrated below by means of FIG. 4. If, on the other hand, the event E is a message from another coordination server, the strategy manager is called according to block 36 in order to process event E as a message from another coordination server, as will be illustrated below using FIG. 33.

After all three steps 34, 35 and 36, the control of the program main loop returns to block 27 according to FIG. 3 to run through the same cycle with regard of a next independent process P.

Figure 4:
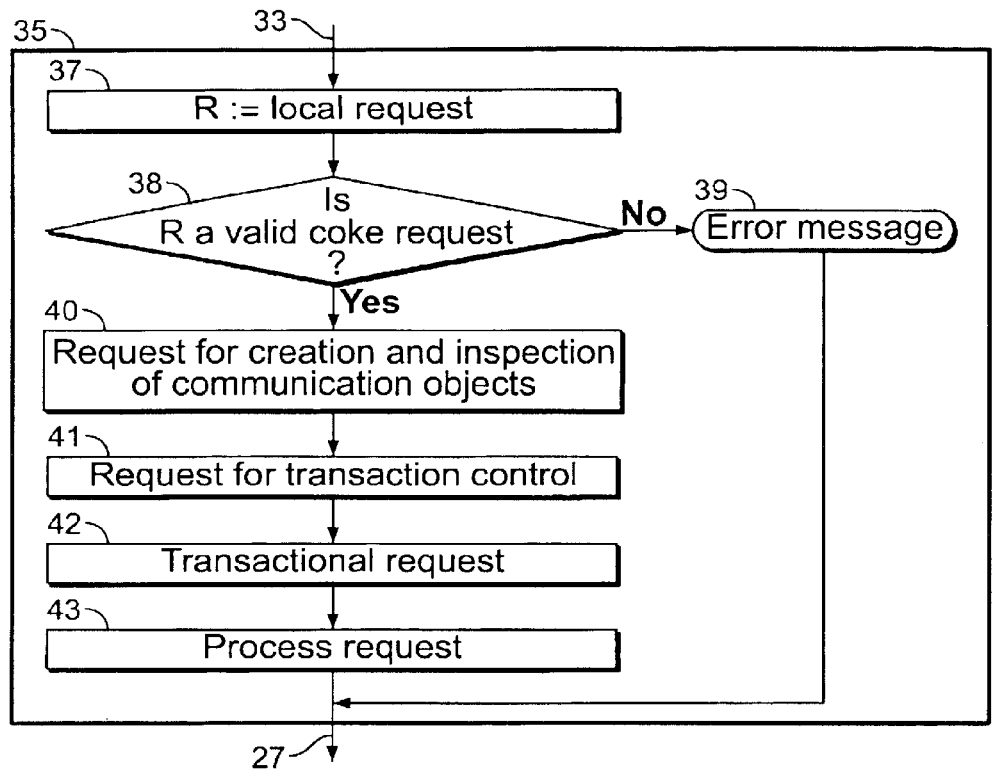
FIG. 4 shows the treatment of local requests in a logical control scheme.

As can be seen in FIG. 4, in the sub-program, block 35 in FIG. 3, initially in step 37 the request (event E in FIG. 3) is defined as a local request R. In 38, it is asked whether request R is a valid query of a coordination server. If not, in step 39 a failure message is generated, and the control is passed immediately to the end of subprogram 35. If R, however, is a valid request, according to block 40 (cf. explanation of FIG. 5 below) control is passed to a subprogram concerning the creation and inspection of communication objects; then a subprogram follows, block 41 (see FIG. 9), concerning transaction control, then a subprogram, block 42, concerning transactional requests (see FIG. 13), and finally, in block 43, a subprogram "process request" (see also the following explanation of FIG. 24). With these parts 40 to 43, the type of the respective local request R is investigated, and the necessary actions are triggered.

In the following and with reference to FIGS. 5 to 40, the commands and functions partly already generally mentioned, but partially not yet mentioned are discussed in greater detail; in general, as can already be observed in FIGS. 3 and 4, in the figures the blocks with bold lines refer to figures that are to be explained hereinafter and that show the respective blocks in bold lines to clarify the context.

The commands described below referring to FIGS. 5 to 40, may be seen as an extension of a traditional language to a "coordination" language (by means of library extension or embedding into the respective programming language). The names of the commands here mentioned are clearly arbitrary and must be seen as examples. The used description is generally based on a programming language neutral syntax and is independent of the data types of the corresponding host language. The execution of the commands takes place within the coordination servers or agents; the command names solely used as examples (e.g. "cobj_create", etc.), are part of the user interface, clarifying the meaning of programming language extension ($P_i$ turns into Pi & Co).

Figure 5:
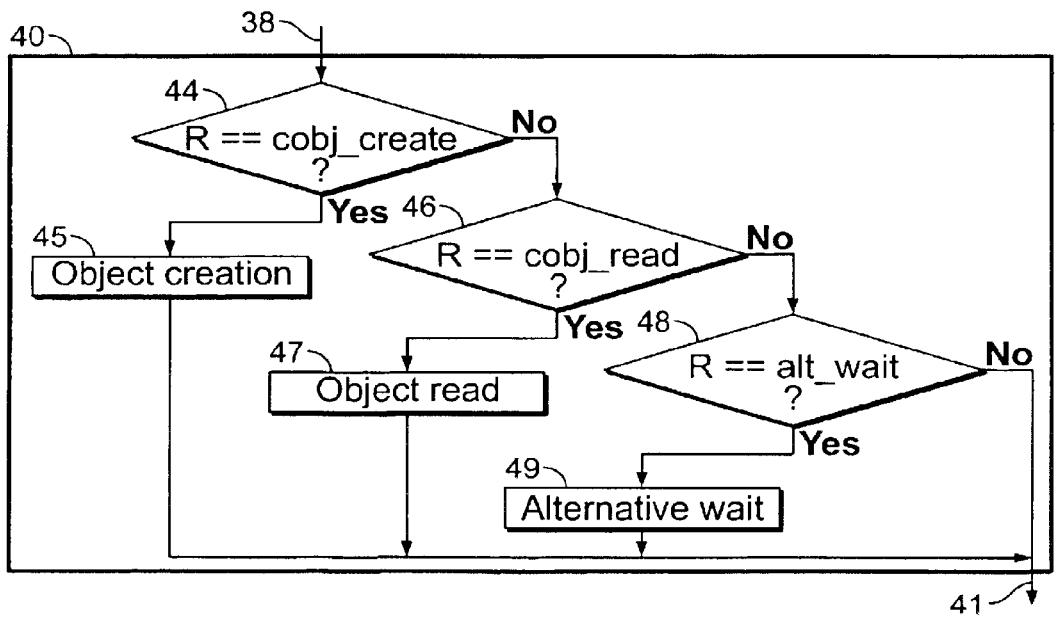
FIG. 5 shows the general control for the creation and inspection of communication objects.

Firstly, the general control flow of the request to create and inspect communication objects, block 40 in FIG. 4, is discussed using FIG. 5. The type of local request R is retrieved by means of different questions, and depending on the result, different functions on objects are triggered, which will be discussed using FIGS. 6, 7 and 8.

In detail, initially at 44 it is asked whether the local request R is a request for the creation of a new object. If yes, the block 45 "object creation" (see FIG. 6) follows. If not, next it is asked whether the incoming local request is a request for "object read" (query 46). If yes, in block 47 (see FIG. 7) the command "read object" is executed. If not, as a third query it is checked at 48 whether the local request is a request for "alternative wait" (supervision of objects). If yes, the subprogram "alternative wait", block 49 (see FIG. 8), is called; if not, block 41 in FIG. 4 follows.

Following is an illustration of the above mentioned functions, where named examples are shown only for those functions which are exported to the application interface, object creation: OID<-cobj_create(type, strategy) (cf. FIG. 6)

Figure 6:
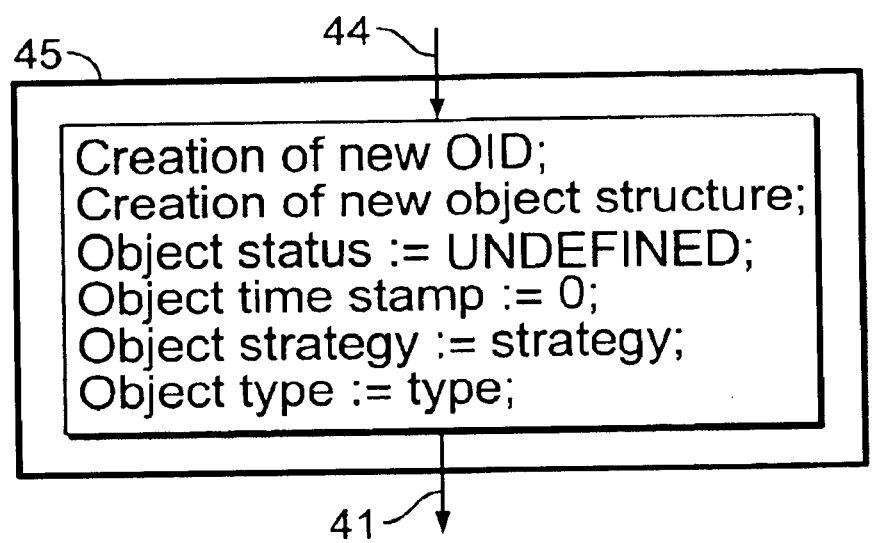
FIGS. 6 to 8 show the functions corresponding to FIG. 5 in form of flow charts.
Figure 7:
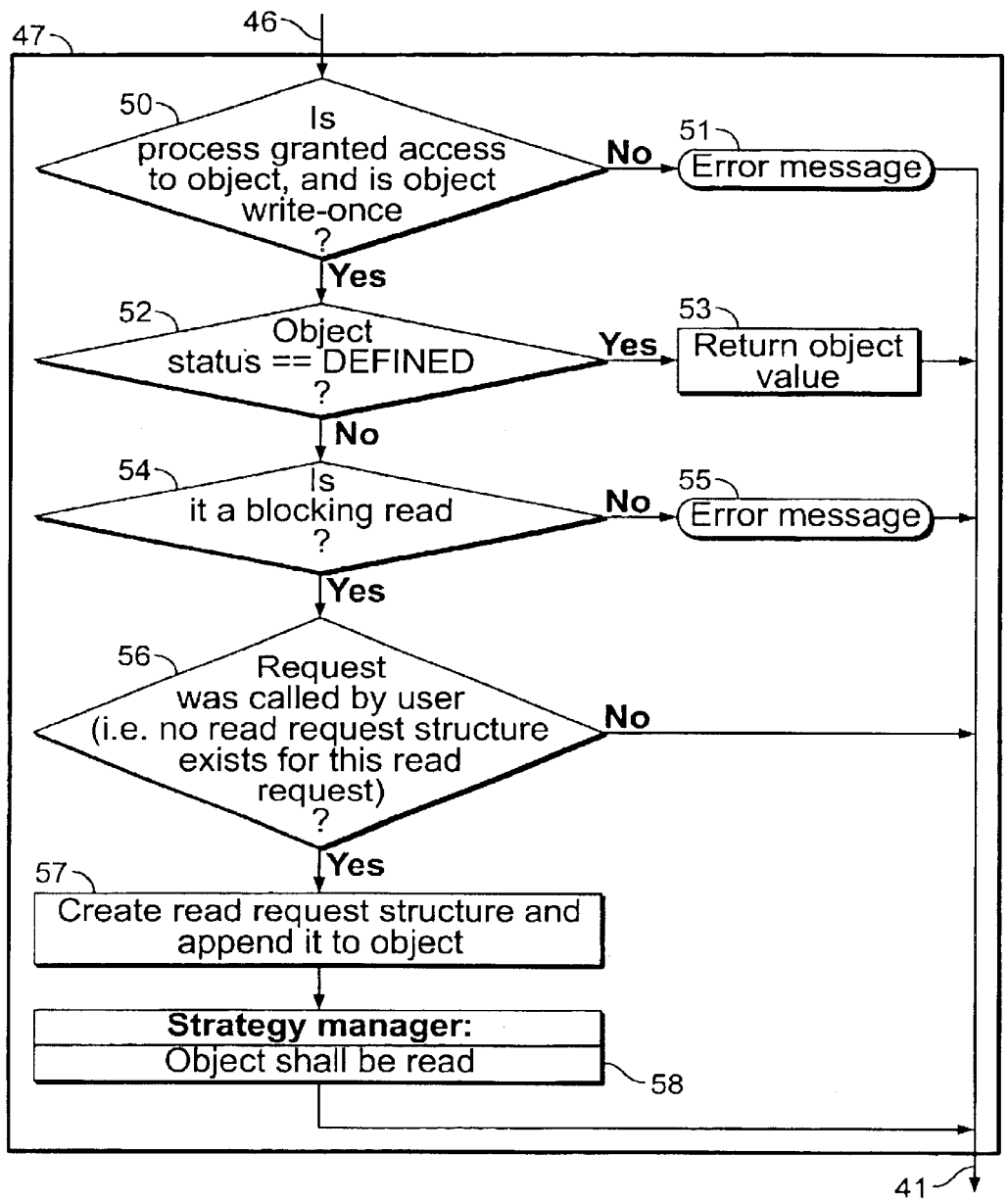

This function serves to create a new communication object, where as the answer a unique object identification number (OID) is returned for the new object. This OID is passed as argument to other commands. If desired, when creating a new object—as a so-called option—a distribution strategy can be selected; by default (i.e. as suggested by the system) a standard strategy is used. The type defined upon creation specifies whether the object can be written only once, or whether the object is updateable. Moreover, as can be seen in FIG. 6, block 45, a new object structure is created, which is administrated by the local agent, is uniquely identified by its OID, and represents a new communication object. The object status is initially undefined ("UNDEFINED"), and an object time stamp is defined (and set to null).

object reading: value<-cobj_read(BlockingFlag, OID) (cf. FIG. 7)

This function is used for non-updateable communication objects and returns the contents of the desired communication object, if the latter is already defined (i.e., was written in a transaction). If the communication object is still undefined and a blocking flag is set, the request will wait until the object is written, or otherwise it will return an error code.

Also, if the process is not authorized to access the object, an error code is returned.

If, however, the object is defined and accessible, its value will be returned; otherwise, if the blocking flag is set, the read request will be appended to the object, where it is automatically woken up as soon as the object is written.

It depends on the respective distribution strategy and its flags, whether, it is sufficient for the read request to check the local object structure, or whether communication steps have to be performed which ask other agents for the state and value of the object.

In detail, with "object read" according to FIG. 7 it is initially tested at 50 whether the process is granted access to the object, and whether the object is of write-once type. If the result of this query is negative, at 51 an error message occurs, but if the result, is positive, at 52 a test takes place whether the object state is defined. If it is defined, at 53 the value of the object is returned, and control proceeds to the end of the function (block 41 in FIG. 5). If, however, the object state is not defined, at 54 it checked whether if the reading is blocking (i.e. whether the blocking flag is set), and if not, at 55 an error message occurs; if yes, in step 56 it is then tested whether the request has been issued by the user, which means that there exists no read request structure yet for this read request. If the result is negative, control proceeds to step 41; if the result is positive, according to block 57 a read request structure is created, which is then appended to the object. Then, according to block 58 the strategy manger is called to execute the function that the object is to be read. This step 58 will be illustrated in greater detail below, using FIG. 34.

alternative wait: FiredOID<-alt _wait(ListOFOIDS)(cf. FIG. 8)

This command is used for non-updateable objects and waits for a group of communication objects like a blocking read. As soon as one of these communication objects from this list becomes defined, the command returns the corresponding OID number of the object. Thus, the synchronization of several communication objects can be programmed very conveniently (without "busy-waiting").

If one of the objects denoted in list (ListOfOIDs) does not exist or is not of write-once the type, or if the process is not authorized to access one of these objects (see block 59), according to step 60 an error message occurs.

Figure 8:
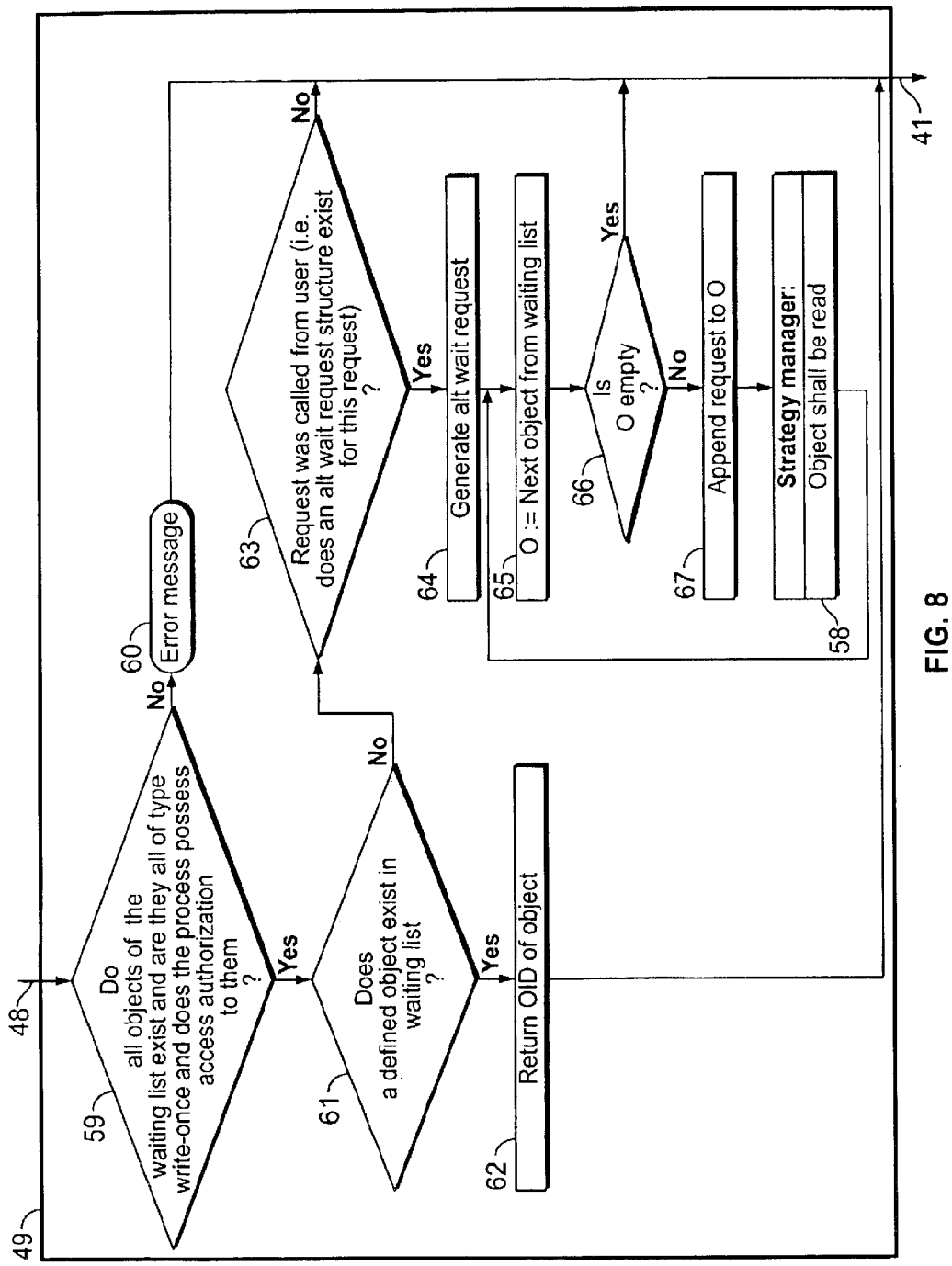

If the object denoted by the OID is a defined object (test 61), this object is returned as the "fired object" (resp. its list index is returned), see block 62 in FIG. 8. This holds true for each OID from the list ListOfOIDs.

If no object from the list ListOfOIDs is defined, an "alt_wait" request is appended to each object (i.e. to the object structure which is maintained by its local agent—21, 22 or 23, according to FIG. 2) from the list (steps 64 to 67, FIG. 8), provided that according to test 63 the request was called by the user.

At 64 an "alternative wait" request is created, at 65 the next object 0 from the waiting list (ListOfOIDs) is taken, and at 66 it is tested whether such an object O exists; if not, the "alt_wait" request is appended to the object O (step 67). Then the strategy manager is informed that object O is to be read, see step 58 (which, as already mentioned, will be discussed in greater detail by means of FIG. 34, below). Steps 65 to 67 and 58 are repeated for all objects of the list. As soon as an object from the list ListOfOIDs is defined (i.e. written in a transaction), this request is automatically fulfilled, the number of the object in the list is returned, and the request on the actual object and all requests sticking on the other objects are removed.

Figure 9:
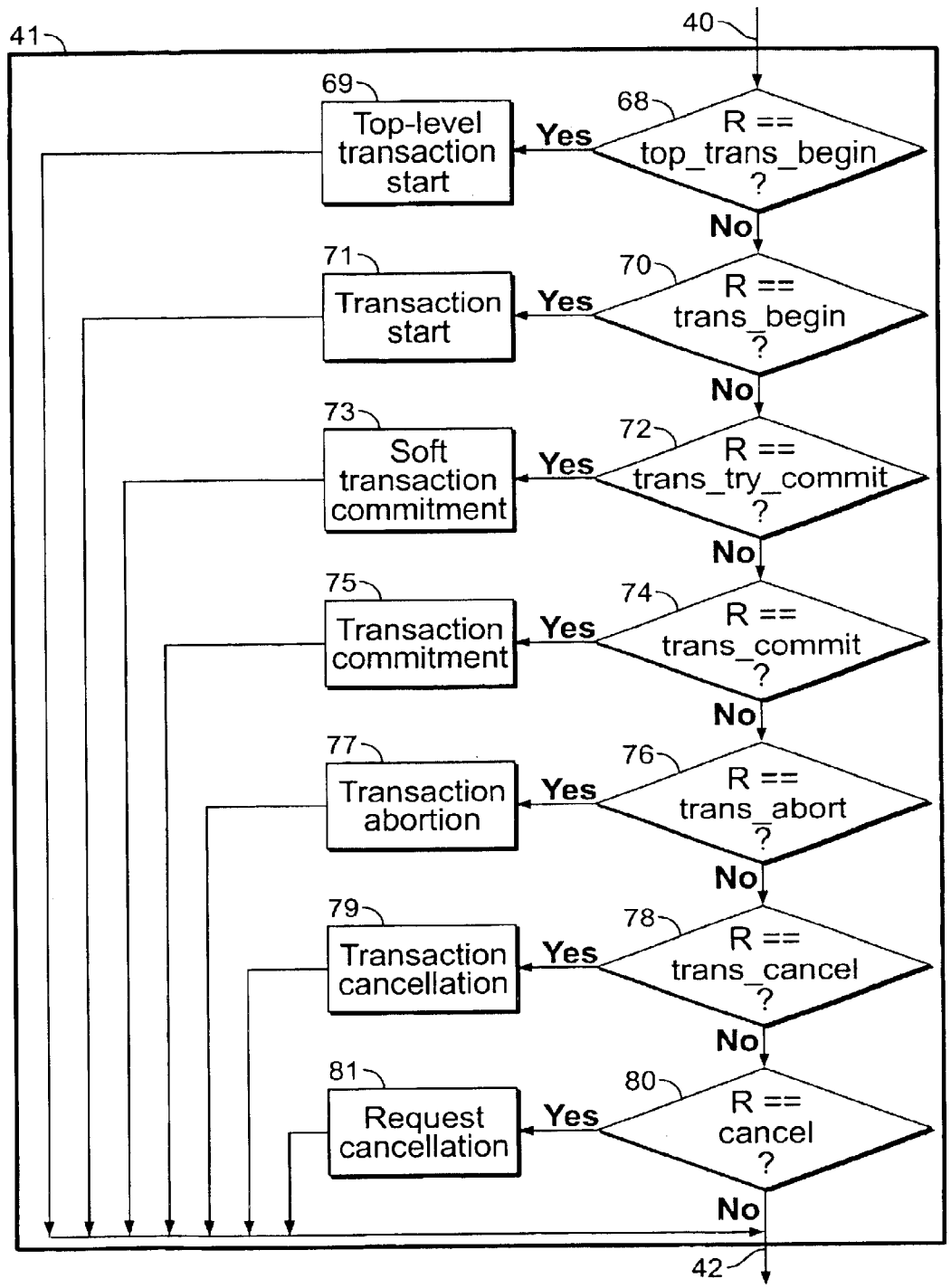
FIG. 9 gives more details about the control flow of the transaction control shown in FIG. 4.

The flow of the transaction control is as shown in general in the scheme, block 41, of FIG. 9; the respective arrived request R is now investigated with regard to possibly contained transactional requests. Initially, at 68 it is tested whether a top-level transaction is to be started, and if yes, this is done according to block 69 (see the following explanation of FIG. 10); if not, it is tested at 70 whether a subtransaction is to be started, and if yes, this is done according to block 71 (see FIG. 11); if not true, it is tested at 72 whether a soft transaction commitment is to take place; if yes, the soft transaction commit is done according to block 73 (see FIG. 12 in connection with FIG. 13); if not, it is tested whether a commitment with a possible abortion (hard transaction commitment) is to be done, see block 74 in FIG. 9; if the result is yes, the transaction commitment is done according to block 75, which is shown in FIG. 12 together with the soft transaction commitment. If the request R is no transaction commitment request, next it is tested at 76 whether an abortion of the transaction is required, and if yes, this transaction abortion is done according to block 77 (see FIG. 14); if not, next it is tested at 78 whether the request concerns a transaction cancellation, and if yes, this cancellation is done according to block 79 (see also FIG. 15); if not it is finally tested at 80 whether the request concerns the cancellation of a transactional request, and if yes, at 81 this request cancellation is performed (see also FIG. 16); if not, the flow continues after the execution of the single transactional functions 69, 71, 73, 75, 77, 79 or 81, at block 42 in FIG. 4, which is the block for transactional requests as illustrated below in greater detail by means of FIG. 17.

Figure 10:
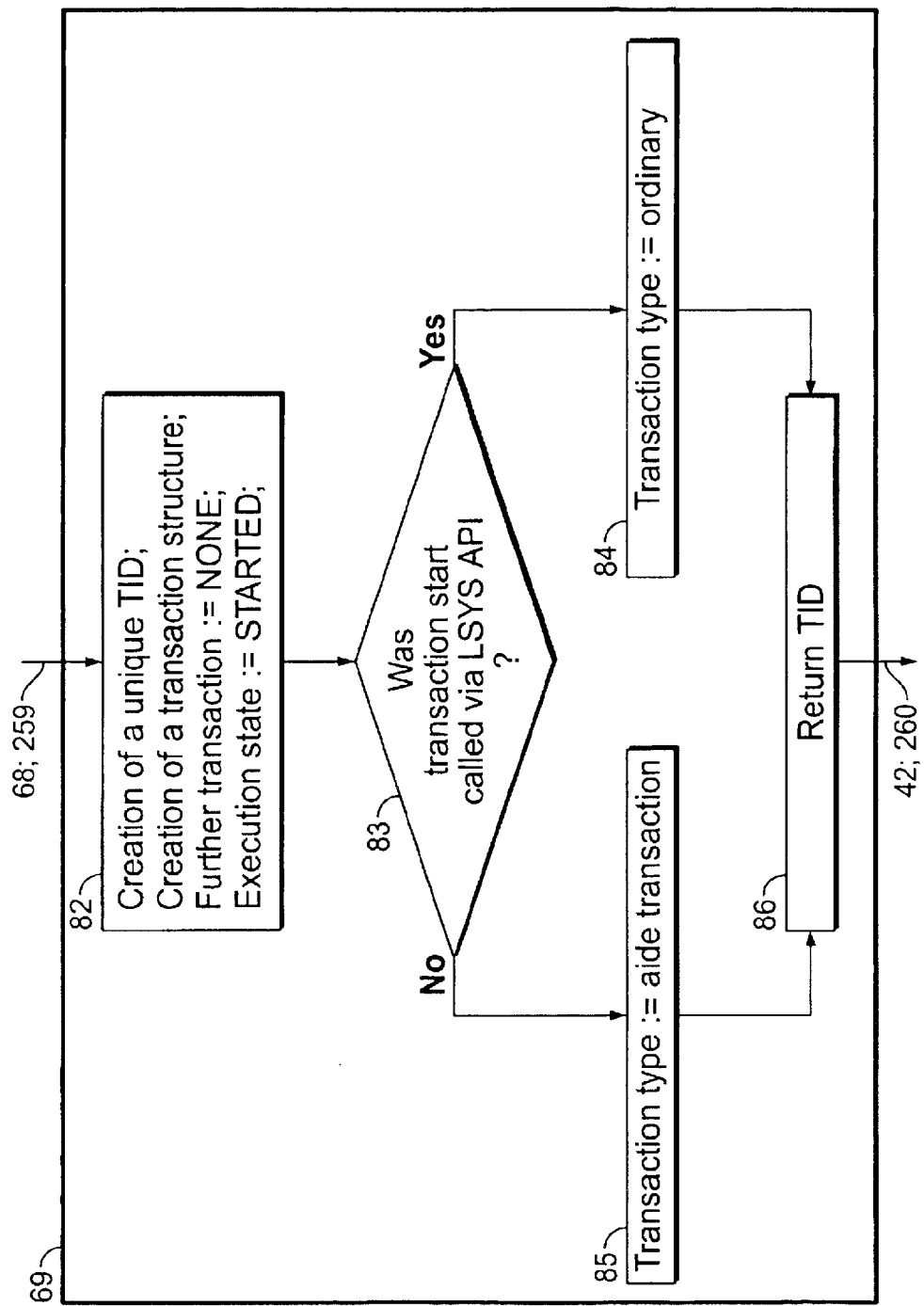
FIGS. 10 to 16 show corresponding transactions.
Figure 11:
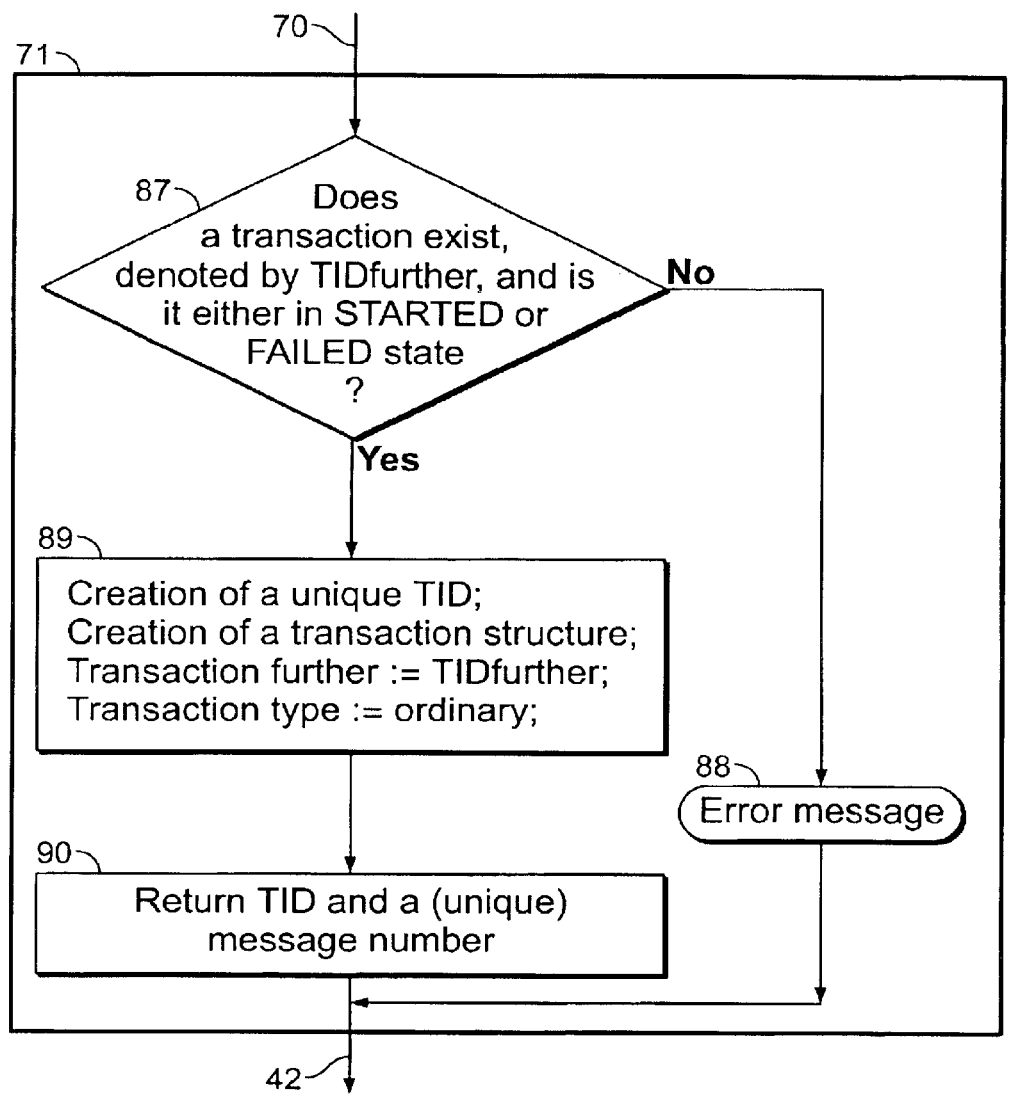
Figure 12:
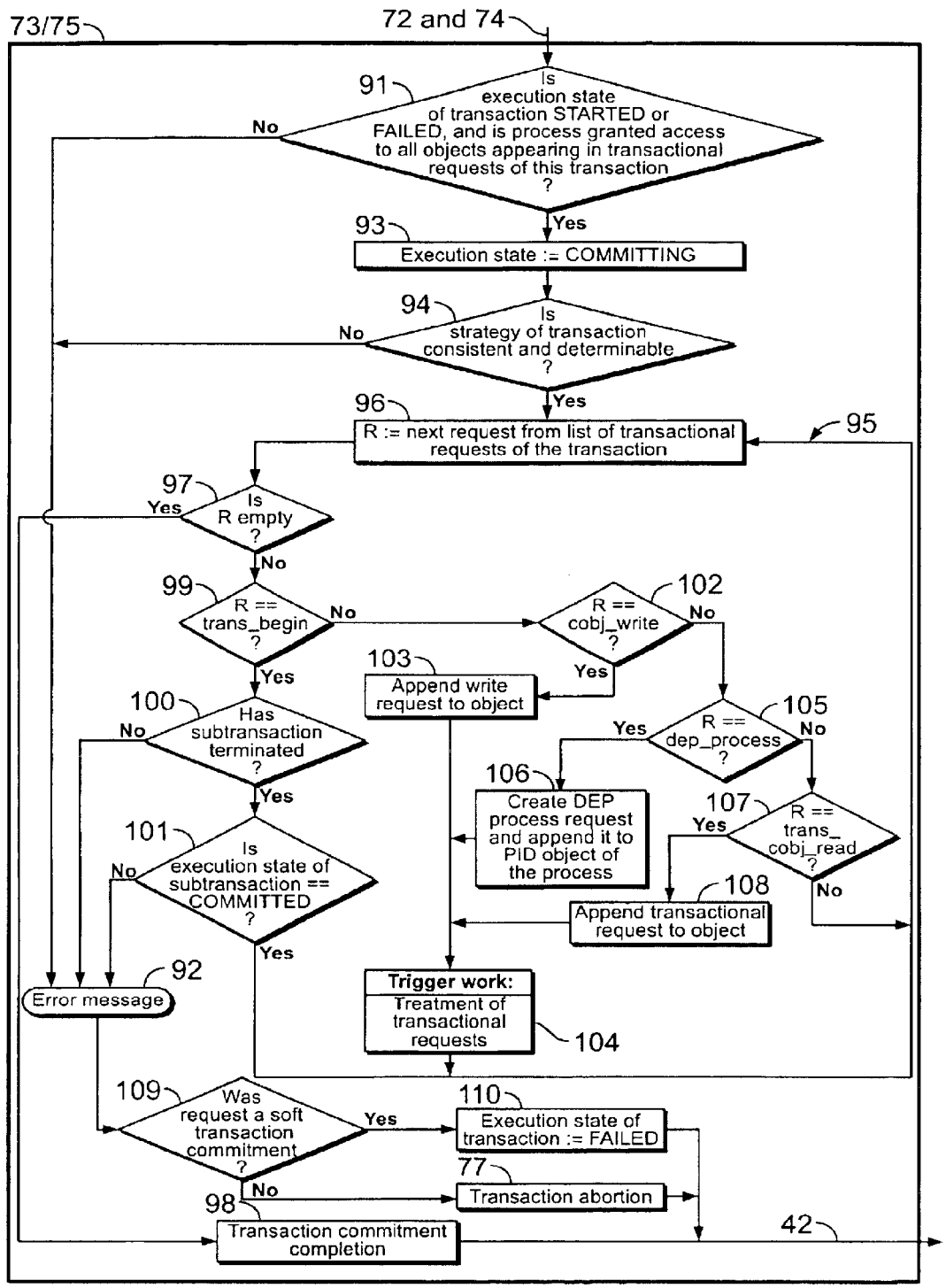

Before, the single transactional functions 69, 71, 73, 75, 77, 79 or 81, will be illustrated in greater detail according to FIGS. 10, 11, 12 (with 13), 14, 15, and 16.

start of a top-level transaction: TID>-top—trans_begin (cf. FIG. 10)

By means of this function a new top-level transaction is created and its unique identification number (TID) is returned. The TID is passed as argument to other commands. More precisely, with these functions in step 82 a unique TID is generated and a transaction structure uniquely identified by this TID is created, with a note that this is a top-level transaction (i.e. it does not have a father transaction). The execution state of TID is set to started ("STARTED"). Then at 83 it is tested whether the start of the transaction has been called via the application interface (API) of the local software system; if this is true, the transaction type is defined as normal (step 84); if this is not true, the transaction type is set to be an aide transaction (step 85). In both cases, subsequently the TID is returned (step 86).

start of a (sub)transaction: (TID, MsgNr)<-trans_begin (TID$_{father}$) (cf. FIG. 11)

This function, block 71 in FIG. 11, serves for the creation of a nested subtransaction; a TID is returned together with the unique identification of this subtransaction request. (More precisely, trans_begin is also a transactional request.) The argument TID$_{father}$ must denote a valid TID in which this transaction is started as a subtransaction, and this is tested initially at 87. TID$_{father}$ depends on the success of TID, and TID must be aborted, if TID$_{father}$ does not succeed. As the isolation property of transactions has been relaxed, TID may commit before TID$_{father}$ has finished. If, however, TID$_{father}$ fails afterwards, TID will be compensated.

Essentially, the procedure is the same as for top_trans_begin, only that a note is made in the transaction structure that TID$_{father}$ is the father transaction of TID.

Apart from the test for the TID$_{father}$ transaction, at 87 it is also checked whether this TID$_{father}$ transaction is in the state of started ("STARTED") or whether is has not succeeded ("FAILED"). If the result of the test at 87 is negative, in step 88 an error message is returned. Otherwise in step 89 a unique TID is generated, the corresponding transaction structure is created, the transaction father (TID$_{father}$) is defined, the execution state of the transaction is set to started ("STARTED"), and the transaction type is set to normal. Subsequently, at 90, the TID and the unique message number are returned, and then—like in the case of the error message according to step 88— the control proceeds to block 42 (FIG. 4).

soft transaction commitment: Result<-trans_try_commit (TID)

and transaction commitment: Result<-trans_commit(TID) (cf. FIG. 12)

The start of a weak transaction commitment (i.e. a commitment action without an abortion) of a transaction TID, tiggers the execution of all transactional requests (analogous to the "hard" or unconditional transaction commitment) called in this transaction; if only one of these requests cannot be executed, the commitment cannot succeed, and as a result the number of the failed request is returned. Otherwise, if the commitment is successful, the effects of all requests are made visible in one atomic step and all specified on-commitment actions are started; moreover, a success message is returned. If the procedure for a (weak) transaction commitment is called by the user, the transaction identification TID must not denote an aid transaction.

In detail, if the transaction denoted by TID does not exist, or if its execution state is neither "STARTED" nor "FAILED", or if the process is not authorized to access the objects appearing in the transactional requests (see test block 91 in FIG. 12), an error message (step 92 in FIG. 12) is created. Moreover, the execution state of the transaction is set to "COMMITTING" (see block 93). Then—according to block 94—the strategy of the transaction is determined or checked, respectively, by means of the requests called in this transaction, i.e. the strategies of all objects written in this transaction by write requests, of all objects read by cobj_trans_read (see below), of all objects serving as PIDs or appear in entries in the requests dep_process, compensation_action, and on_commitment_action described below, and the strategies of all subtransactions must have the same the reliability class and must belong to the same basic strategy. If this is not the case, again an error message will be generated (see block 92).

Then an attempt is made to fulfill each transactional request of this transaction. If applicable, all transactional requests R are treated sequentially by loop 95 with 96 as the first step (which invariably switches to the next request), until the list of requests has been completely treated, i.e. it is empty (test 97), where upon the control passes to the procedure "transaction commitment termination" (see block 98 and FIG. 13).

As long as requests exist, i.e. R is not empty (test 97), the following happens:

If R is a subtransaction (test 99), the request must have completed (test 100) and must have committed successfully (test 101); otherwise, an error message is created (block 92).

If request R is a write request (test 102), it is appended (block 103) to the object structure of the object OID to be written, and an attempt is a made to write into the object (block 104); this procedure will be illustrated hereinafter using FIG. 23, for how the following explanations will suffice: the corresponding distribution strategy is called in order to obtain an exclusive lock on OID (i.e. the "main copy" if replication protocols are used); if the OID is already locked by another transaction and if the locking transaction is younger than the current transaction TID, the younger transaction must temporarily release the lock for TID (deadlock prevention!); the request of the younger transaction will be woken up later automatically; if the OID is already defined and if it is a write-once object, an error message occurs; otherwise, the object carrying the number OID will now be locked for TID, and tentatively the value is written into OID (i.e. it is not yet globally visible); in this case, all write requests called so far called in this transaction must be considered; communication objects appearing in an overwritten value of an updateable object, are subjected to garbage collection depending on the protocol at hand (see FIG. 40), provided that their reference counter has decremented to 0;

If the request concerns a dependent process (which will be explained in detail by means of FIG. 25), i.e. it is a dep_process request, which is checked by means of test 105 in FIG. 12, in step 106 a corresponding dep_process request is created which is then appended to the PID object of the process, and subsequently this transactional request is treated again in block 104 (see FIG. 23); it is waited until this dep_process request has terminated. If the execution state of this request is neither "PREPARED" nor "CANCELLED", an error message occurs.

If the request R is a request for transactional read (see FIG. 19), i.e. a cobj_trans_read request, which is tested at 107 in FIG. 12, this request (according to step 108) is will be appended to the object structure of the object OID to be written, and the control flow proceeds to the procedure according to block 104 (see FIG., 23), calling the respective distribution strategy in order to obtain an exclusive lock for the object OID (viz. the above procedure for write requests); then it is tested whether the value read is still valid; if not, or if the initial trans_cobj_read request has failed, an error message occurs.

As soon as all requests have been executed successfully (test: R is empty, block 97), as described above, the procedure "transaction commitment termination" block 98 (see FIG. 13) is called; no lock may be given up in favour of other transactions; all effects (values written into objects) are now made visible in one (atomic) step; this also includes the starting of all "on_commitment_action" requests of this transaction (the same procedure as the start of an independent process to be described) and the sending of a signal "COMMIT" to all dep_process procedures of this transaction. The reliability of the effects of the transaction depend on the respective distribution strategy of the transaction.

If the transaction was a top-level transaction, its transaction structure may now be removed (not shown in FIG. 12 for the sake of simplicity). Otherwise, its execution state is set to "COMMITTED", and it must be kept until its father transaction terminates, because compensation action procedures are still needed until then. If it is an aide transaction, the termination (exit) of the corresponding independent process is now called.

The call of the distribution strategy in order to obtain an exclusive lock; need not be successful immediately, but may require a number of communication steps. As soon as a decision exists, the transaction manager is activated automatically in order to proceed with the commitment (FIG. 12).

An error message—see block 92 in FIG. 12 in the execution of transactional requests does not mean that the transaction is aborted; in case of a soft transaction commitment (test 109), the execution state of the transaction is set to "FAILED" (step 110), and the message number (MsgNr) of the request which caused the error message can be queried; this request can be withdrawn by means of "cancel" and an attempt to commit the transaction may be made again.

If the strategy of the transaction is a "reliable" strategy, the effects of the transaction will also survive system failures.

Figure 14:
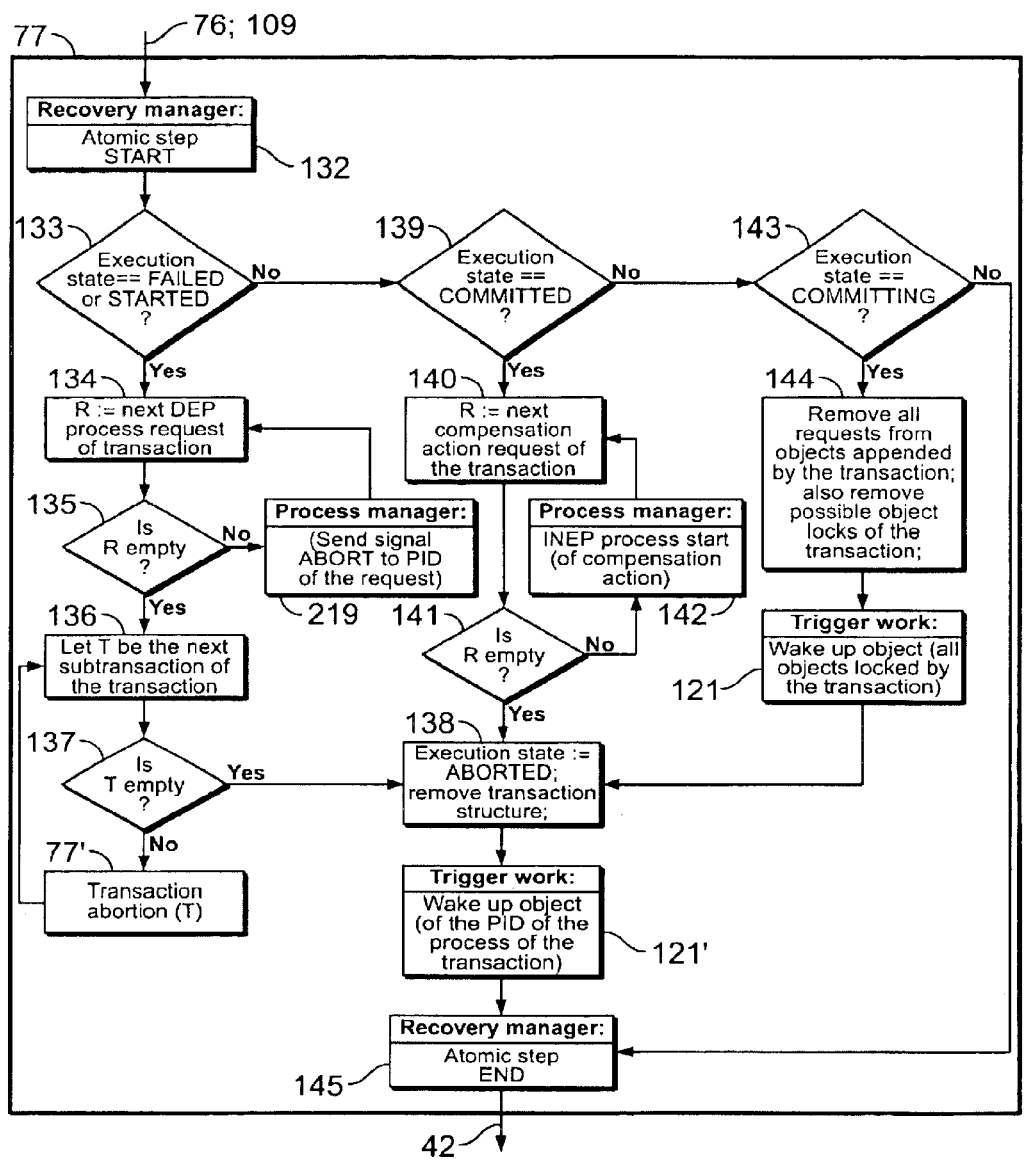

If the result of the test 109 is, that a "hard" transaction commitment is involved, this function trans_commit behaves like the above soft transaction commitment function (trans_try_commit), with the exception that if the commitment is not successful, the transaction TID will be automatically aborted, see block 77 in FIG. 12, "trans_abort", illustrated in detail in FIG. 14.

Figure 13:
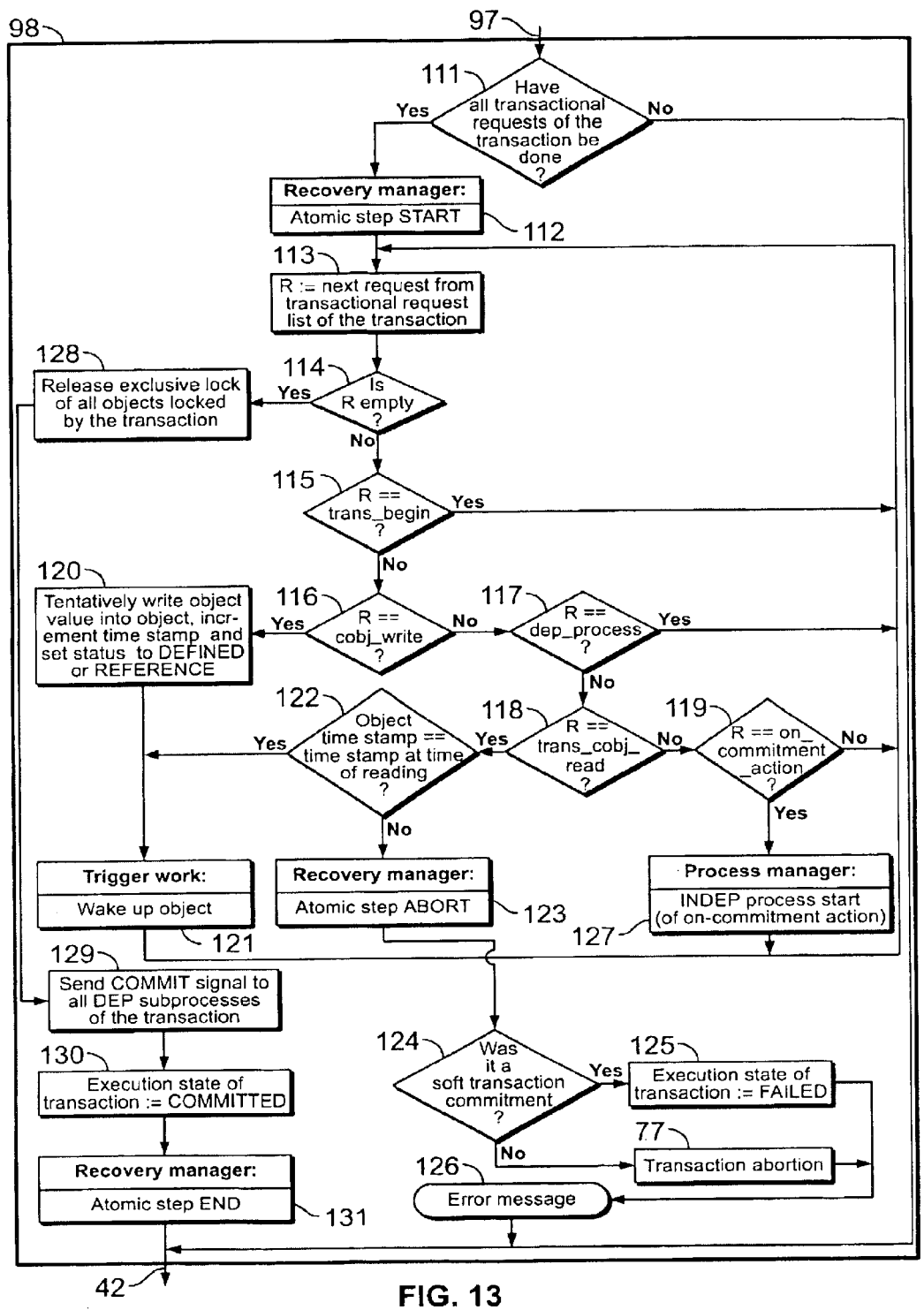

Before the abortion of a transaction is explained in detail by means of FIG. 14, an explanation is now given of the procedure "transaction commitment termination" (see block 98 in FIG. 12) by means of FIG. 13.

In this procedure, it is initially tested at 111 whether all transactional requests of the transaction have already been done; if not, control passes immediately to the exit of this procedure (and, for example, to block 42 in FIG. 4). If the result of the test at 111 is positive however, at 112 the recovery manager is called in order, to perform the atomic step START. Subsequently, the next request is taken from the list of transactional requests of the transaction (step 113), and at 114 it is tested whether there is another request R in the list R. If R is not empty, i.e. as long as transactional requests exist, it is tested at 115 whether the request concerns the creation of a subtransaction; if yes, control returns to step 113; if not, it is then tested at 116, whether the request concerns a transactional request "object write". If not, at 117 it is tested whether the request concerns an independent process; if yes, control also returns to step 113, otherwise it is tested at 118 whether the request is the transactional request "transactional object read"; if not, then at 119 it is tested whether this request concerns the transactional request "om-commitment action declaration"; if not, the control also returns to step 113.

Figure 21:
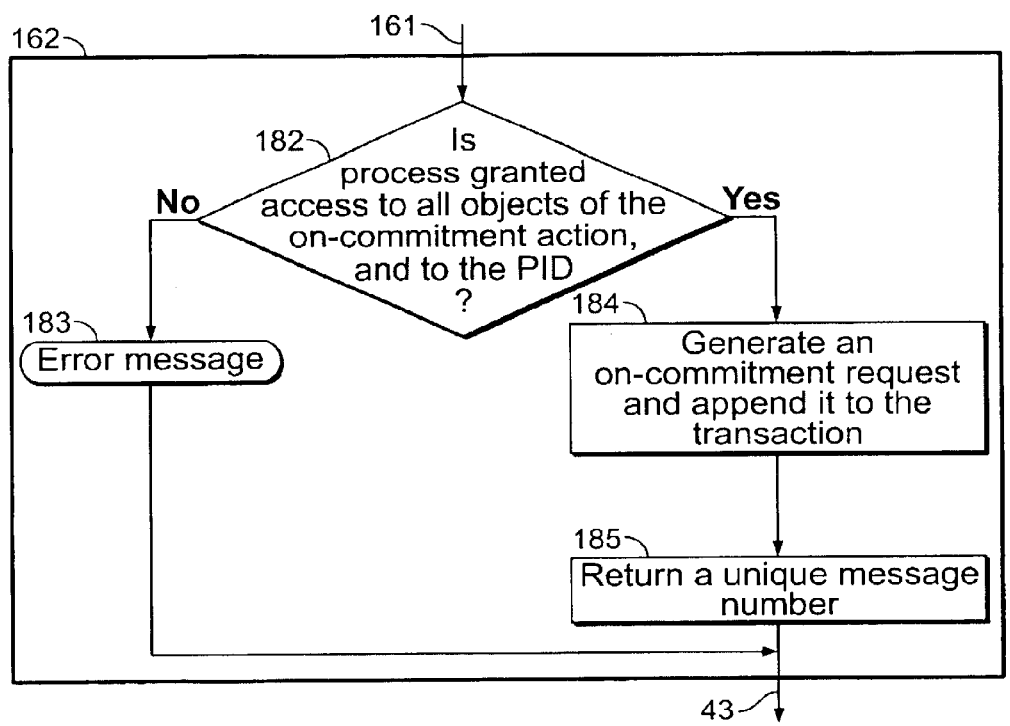

The transactional requests "object write", "transactional object read" and "on-commitment action declaration" are illustrated in detail below in FIGS. 18, 19 and 21.

If in the control flow of FIG. 13 the result of the test for "object write", block 116, is positive, in step 120 the value of the object is tentatively written into the object, the time stamp of the object is incremented, and the status of the object is set to "defined" or "reference", respectively. Subsequently, at 121, the transactional procedure "object wake-up" is called, which will be explained below in greater detail by means of FIG. 22, and the control then returns to step 113.

If test 118 reveals that the request is a transactional object read, in step 122 it is tested whether the time stamp of the object concerned equals the time stamp at the time of reading, and if this is the case, procedure 121 "object wake-up" is called, too. If, however, this is not the case, at 123 the recovery manager is called in order to execute the atomic step ABORT, after which it is tested at 124 whether the commitment concerned was a soft or an ordinary (hard) transaction commitment. In case of a hard transaction commitment, according block 77 the transaction is aborted in case of a soft transaction commitment, however, the execution state of the transaction is set to. "FAILED", see block 125 in FIG. 13. In both cases an error message will follow according to step 126.

If the result of the test 119 reveals, that the request R is the declaration of an on-commitment action, according to block 127 the process manager is called in order to start an independent process (as explained below in FIG. 26) for the on-commitment action. Subsequently, control also returns to step 113.

If at test 114 it turns out that there are no requests any more (R is empty), the previously set locks will be released on all objects locked by the transaction, see step 128, and the signal commit is sent to all dependent subprocesses of the transaction, step 129, whereafter in step 130 the execution state of the transaction is set to "COMMITTED". After the successful commitment of the transaction, finally the recovery manager is called to execute the atomic step "END" (block 131). Then, for example, the control is passed to the next procedure (transactional requests according to block 42 in FIG. 4).

In the control flow according to FIG. 9, a transaction abortion follows, after the transaction commitment, as the next option, see block 77, and such a transaction abortion must also be performed at the end of the procedure according to FIG. 12 (transaction commitment).

Transaction abortion: trans_abort (TID) (see FIG. 14)

This function causes the abortion of the specified transaction TID and—if this transaction has subtransactions—their abortion recursively (see block 77' in FIG. 14). It must be noted that if one or more subtransaction(s) has(have) already committed successfully, the abortion of the transaction will cause the execution of the compensation action(s) of those subtransactions which are assumed to also compensate for all effects of their subtransactions, i.e. in this case no cascading compensation takes place. If the transaction TID to be aborted possesses a father transaction, the latter cannot commit successfully unless the transaction TID is cancelled explicitly (by means of "trans_cancel (TID)", see below)

In detail, the control flow according to FIG. 14 is as follows: After the initial call of the recovery manager at 132 to execute the atomic step START, at 133 is is tested whether the starting state of the transaction TID is "FAILED" or "STARTED"; if yes, "trans abort" is also called for all subtransactions of the transaction TID, and the signal "ABORT" is sent to all dependent ("dep_process") processes (see below), which were started in the transaction TID. According to step 134, the next dependent process of the transaction is denoted by R, and at 135 it is tested whether such processes still exist; if R is not yet empty, according to block 219, the process manager is called to send the signal "ABORT" to the PID of the request (as to "send signal", see also FIG. 27, below); if, according to test 135, there are no processes left, i.e. if R is empty, in step 136 the next subtransaction of the transaction is denoted by T, and at 137 it is tested whether there still is one. If there is, this subtransaction T is aborted according to block 77'., and control returns to step 136. If there are no subtransaction any more (exit "Y" of test 137), according to step 138 the starting state of the transaction TID is set to "ABORTED".

If after a negative test result at 133 it turns out in test 139 that the starting state of the transaction TID is "COMMITTED", according to step 140 (definition of the next R); test 141 ("is list R empty?") and block 142 (start of an independent process) all compensation actions of this transaction TID are activated (the same procedure as the starting of an independent (INDEP) process).

If, on the other hand, the starting state of the transaction TID is not "COMMITTED" (Block 139), but "COMMITTING" according to test 143, all transactional requests of the transaction must be found which have been appended to objects by the commitment action, and they must be removed. In addition, potential object locks caused by the transaction TID must be re-set (step 144). Subsequently, the procedure "object wake-up" 121 (see FIG. 22) is called to wake up all objects locked by the transaction. Then, the state of the transaction is set to "ABORTED" and the transaction structure can be removed (step 138). According to step 121', subsequently the procedure "object wake-up" is called again (FIG. 22) to wake up the PID of the process of the transaction. Then, at 145, the recovery manager is called to execute the atomic step "END". This step 145 is also reached if in test 143 it turns out that the state of the transaction is not "COMMITTING".

Figure 15:
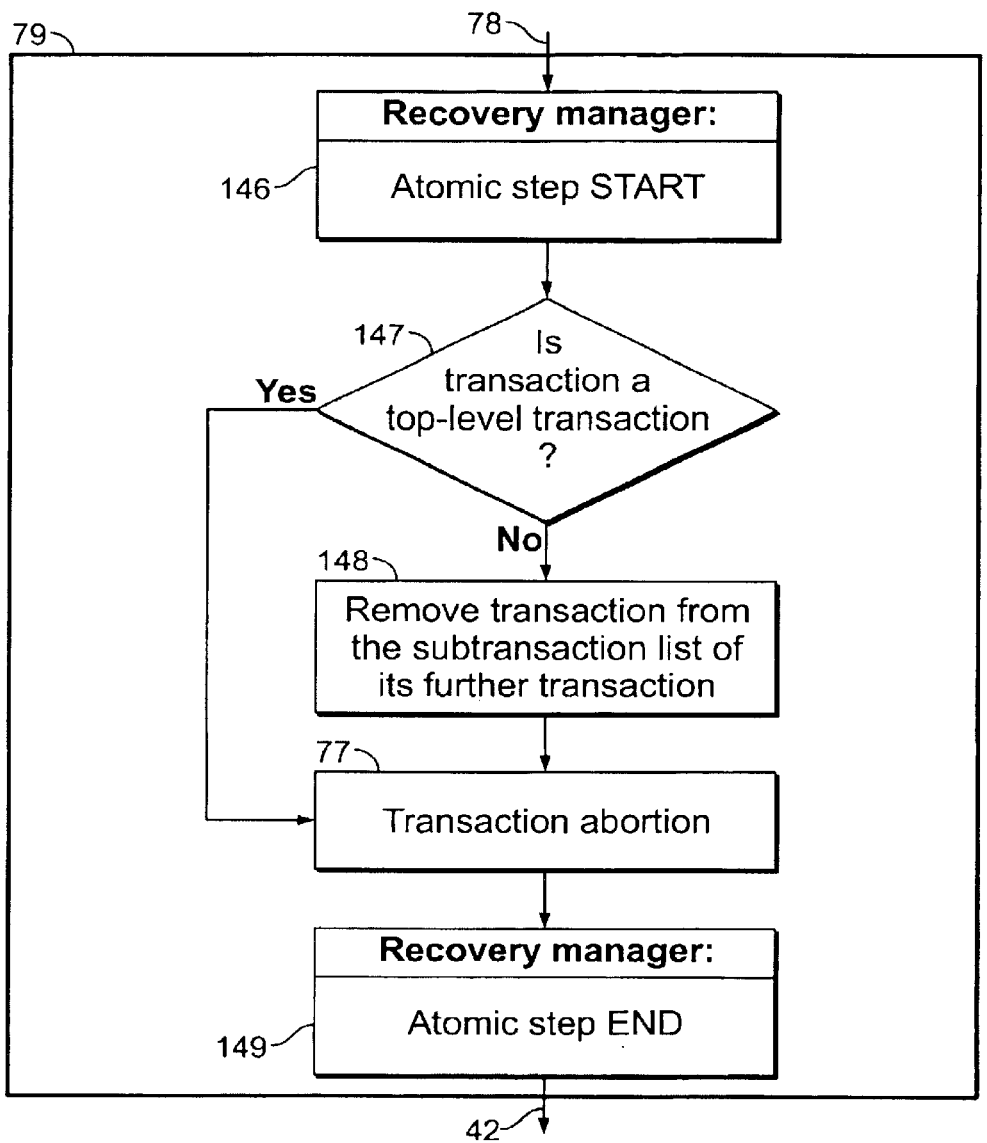

Cancellation of a transaction: trans_cancel (TID) (see FIG. 15 and block 79 in FIG. 9)

This request behaves like "transaction abort" ("trans_abort (TID)"), (see above and block 77 in FIG. 14), except that the success of an enclosing father transaction is not concerned. Thus, if after the START step 146, in test 147 it turns out that the respective transaction TID is not a top-level transaction, according to step 148, the trans begin (TID$_{father}$) request is removed from the list of transactional requests of its father transaction. Afterwards—or if the transaction is a top-level transaction (test 147) the abortion of the transaction follows, block 77, followed by the termination step 149.

Figure 16:
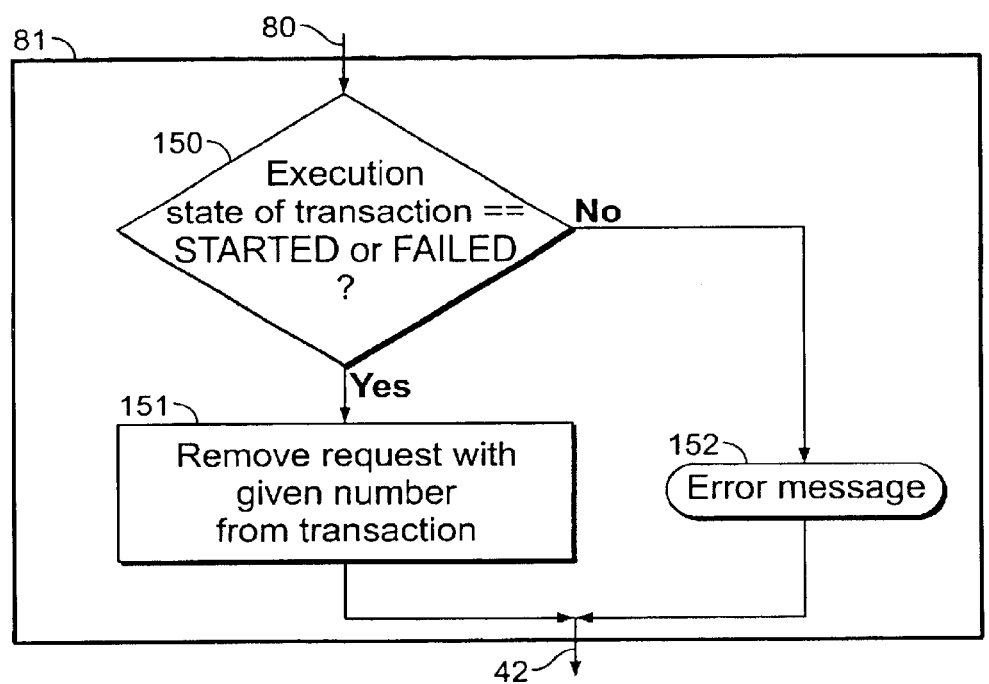

Cancellation of a transactional request: cancel (TID, MsgNr) (block 81 in FIG. 9, see FIG. 16)

The last block in the control flow of FIG. 9 concerns a possible request cancellation (block 81); in this case, according to FIG. 16, initially at 150 the state of the transaction is tested; if this state is STARTED or FAILED, the request having the specified number is removed from the transaction TID, see step 151 in FIG. 16. If the state of the transaction is neither STARTED nor FAILED, an error message is given according to step 152.

Thus, according to FIG. 16, the transactional request specified by the message number "MsgNr" is cancelled. (If this request concerns the creation of a subtransaction, "cancel" has the same effect as "trans cancel", see above, and analogously, for dependent processes it has the same effect as "signal_(CANCEL)", see below; this, however, is not shown in FIG. 16 for the sake of simplicity.)

Figure 17:
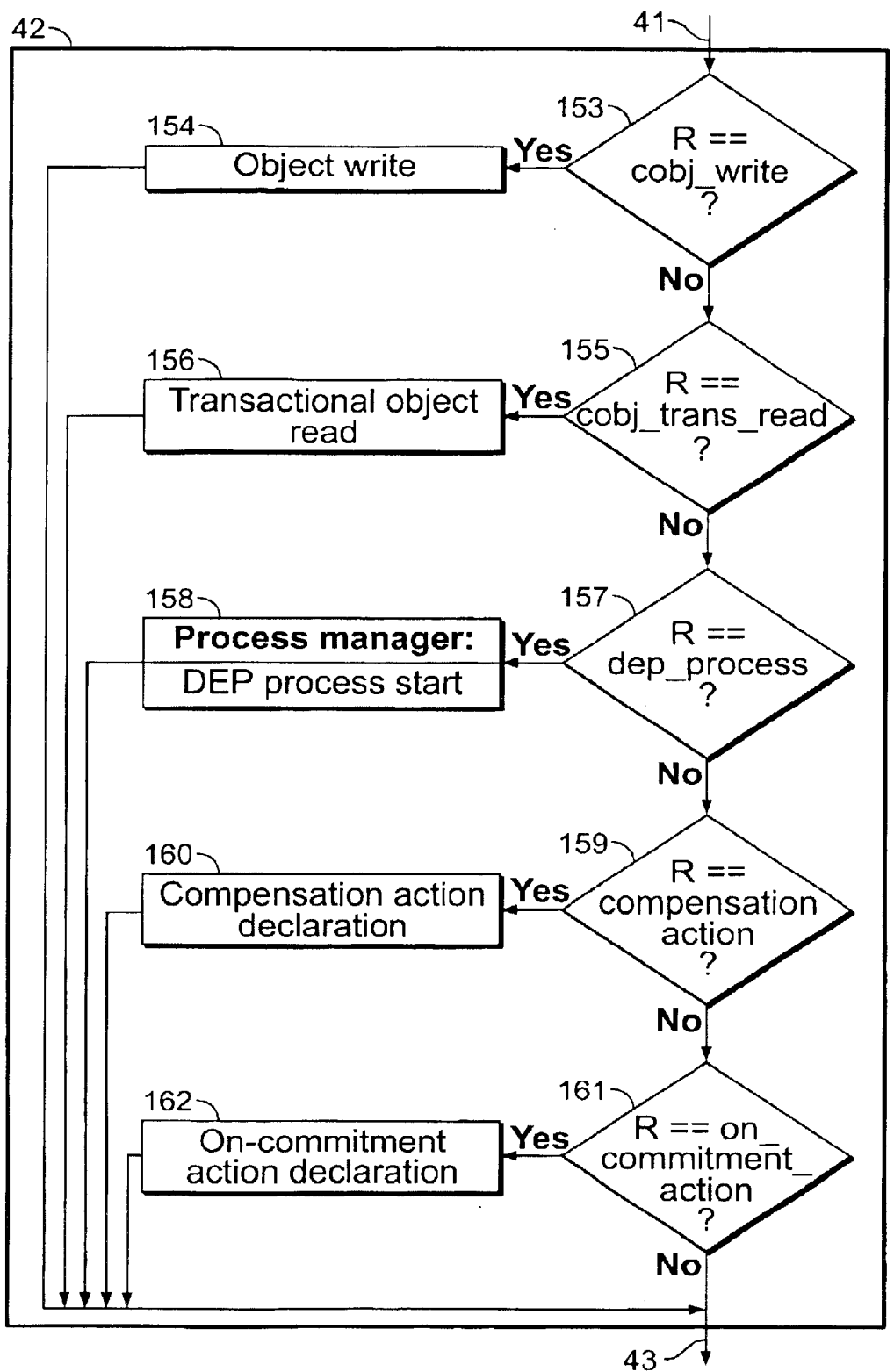
FIG. 17 shows the control flow of transactional requests (according to FIG. 4) in greater detail.

If control returns to FIG. 4, the control flow there after block 41, command for transaction control, is block 42: transactional request. The control flow of this function 42 is shown in FIG. 17 in greater detail; it can be seen that initially it is tested (at 153) whether the request is an object write request. If yes, the procedure "object write" is called according to block 154; this transactional request object write will be explained below in detail using FIG. 18.

If there is no request to write an object, subsequently it is tested at 155 whether a request for transactional read exists. If yes, according to block 156 the procedure "transactional object read" is called, which will be described by means of FIG. 19. If not, at 157 it is tested whether the request concerns a dependent process. If yes, at 158 the process manager is called to start the dependent process; the respective procedure ("dep_process start") will be illustrated in greater detail below in the context of the process manager.

If no dependent process is to be treated, it is tested in step 159 whether the request concerns the declaration of a compensation action, and if so, according to block 160, the procedure "compensation action declaration" will follow (which will be explained in greater detail below using FIG. 20). If not, finally at 161 it is tested whether the request concerns the declaration of an on-commitment action, and if yes, according to block 162 the procedure "on-commitment action" will follow, which will be explained in greater detail below using FIG. 21.

In detail, the transactional requests mentioned above (see FIG. 17) must be explained as follows:

Declaration of an object write: MsgNr<-cobj_write(TID, OID, Value)(see block 154 in FIG. 17; FIG. 18)

Figure 18:
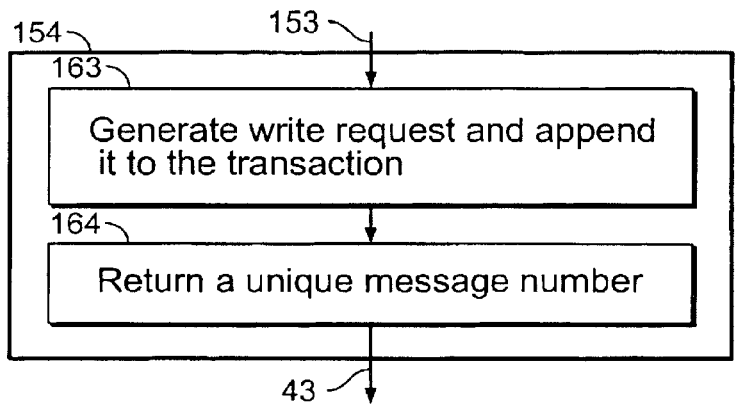
FIGS. 18 to 23 show the corresponding transactional requests (transaction manager) and the necessary subprocedures.
Figure 19:
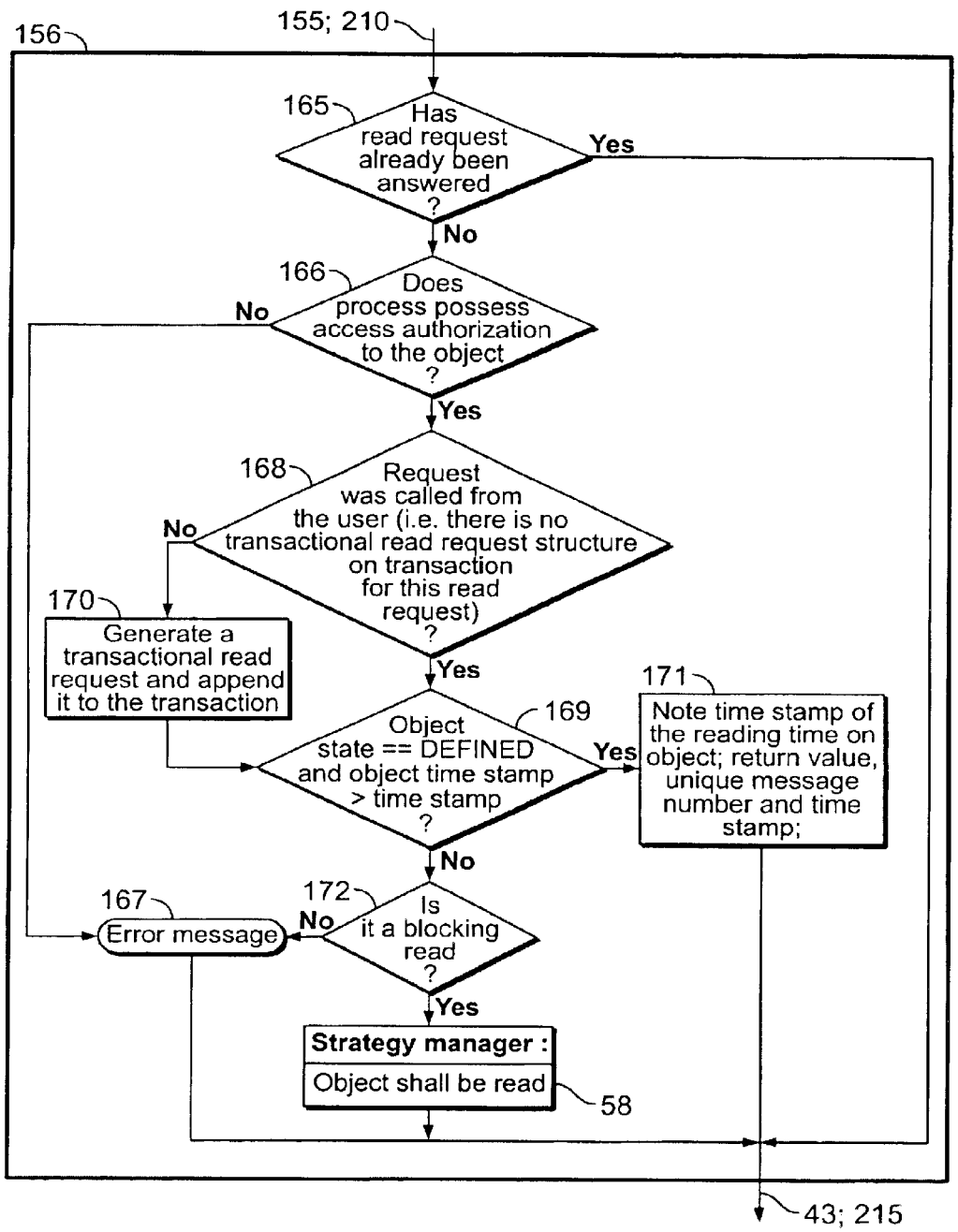

Using this request, the writing of a value into the communication object OID in a transaction TID—see block 163 in FIG. 18 is declared. However, the writing will only be performed at the time of a successful transaction commitment (see above explanations of FIGS. 12 and 13). According to step 164, a locally unique message number ("MsgNr") is returned, which can be used to refer to following this write request, e.g. to cancel it.

In detail, by means of this command, a transactional request structure is generated, which specifies that a value is to be written into the communication object OID, and this request structure is appended to the transaction structure identified by TID.

Transactional object read: (Value, Time2, MsgNr)

This request is used for updateable communication objects and behaves similar to "object read" ("cobj_read"; see above FIG. 7), with a logical time stamp (Time1) being used to assure that the value to be read is more recent than this time stamp. Otherwise, depending on the BlockingFlag, either an error message is returned or it is blocked.

If a BlockingFlag is set, it may be waited (in contrast to "object read") until the time condition is fulfilled, whereafter, besides a locally unique identification of the read request (="MsgNr") the actual value of OID ("Value") and a logical time stamp ("Time2") of the read value, will be returned. If the BlockingFlag is not set, and if the time condition is fulfilled, the same data as described above will be returned; otherwise an error message will occur, and it will be noted that the read did not succeed.

After a successful corresponds read, the transaction TID checks at transaction commitment time whether the time stamp Time2 still to the actual value of the object, and makes the success of the commitment dependent on this fact.

The number ("MsgNr") uniquely identifying the read request can later be used to cancel this command. Analogously to "alt_wait" (see FIG. 8), there also exists a transactional request for updateable communication objects, which also uses time stamps.

In detail, according to FIG. 19, for the transactional object read it is initially tested (step 165) whether the read request has already been answered; if yes, the control flow immediately turns to the exit (e.g. to 43 or 215) of procedure 156; if not, subsequently it is tested at 166 whether the process is authorized to access the object; if this is not the case, according to step 167 an error message is returned, and the control flow also turns to the exit of procedure 156. If the access authorization is given, it is then tested, whether the request has been called by the user (which means that there does not yet exist a transactional read request structure on the transaction for this read request). If the request has been called by the user, subsequently in step 169 the state of the object is tested, i.e. it is tested whether the state is "DEFINED", and it is also tested whether the object time stamp is older, i.e. larger than the time stamp of the value (Time1). If, however, the result of test 168 is that a transactional read request structure does not yet exist, such a structure is created in step 170 and appended to the transaction, whereupon the control flow continues at test 169.

If then the result of test 169 is positive, according to step 171 the time stamp Time2 of the time when the object was read is marked on the object, and the value ("Value"), the above mentioned unique message number (MsgNr) and the time stamp Time2 of the value are returned. Afterwards, control flow goes to the exit of procedure 156.

Figure 34:
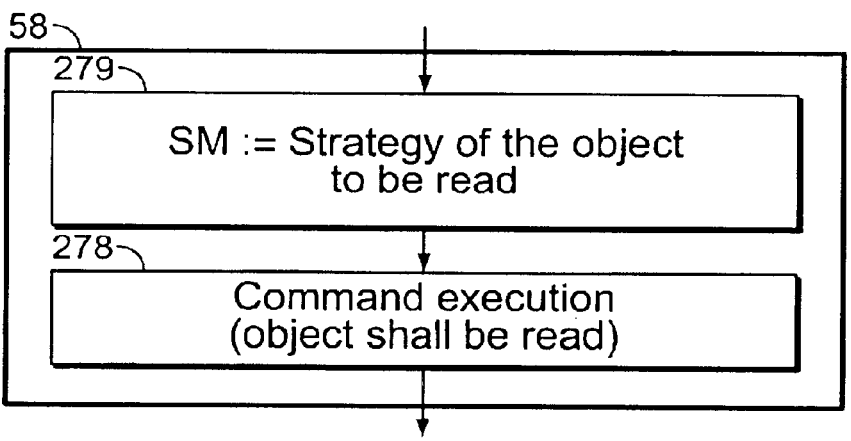

However, if the result of the test at 169 is negative it is tested at 172 whether it is a blocking read (i.e. whether the above mentioned BlockingFlag is set), and if not, according to step 167 an error message occurs; if yes, the strategy manager is called to execute the procedure "object shall be read", block 58 (see also FIG. 34).

DEP process start: generation of a local process structure (see block 158 in FIG. 17): MsgNr Actually, this procedure belongs to the process manager, although it can also be treated as a transactional request (see FIG. 17), and therefor its description is given here.

In general, after the tests of TID, PID, Entry and Site, like in the case of "indep_process" (see below, and FIG. 26), a new process structure is created if the process (with the number PID) shall run on the local computer (="Site"), and the process is started locally; otherwise, the distribution strategy of PID is called to send the process to the computer specified as "Site".

Moreover, a transactional request structure is generated, which specifies that a dependent process has been started, and this transactional request structure is appended to the transaction structure denoted by TID. A locally unique number is returned, which can be used to cancel the request.

A transaction TID can only commit successfully if all its dependent subprocesses have completed successfully.

An aide transaction is generated, which is marked to be the transaction of this process in its process structure. In detail, according to the control flow in FIG. 25, initially at 173 it is tested whether the process is granted access to all objects of the dependent process and to the process identifier PID; if not, according to step 174 an error message occurs, and the control flow goes to the exit of the procedure (for example to 43). If the access authorization is given, in step 175 a dep_process request is generated and appended to the transaction, whereupon at 176 the procedure "create process" is called, which will be explained below in greater detail using FIG. 30. Then, in step 177 a unique message number is returned.

Declaration of a compensation action: MsgNr<-compensate_action(TID, PID, LSYS, Site, Entry)(see FIG. 20 and block 160 in FIG. 17)

At 178 it is tested, whether the current process having the number PID is authorized to access all objects appearing in "Entry" and to the PID; if not, an error message is created (step 179).

Otherwise, in step 180 a transactional request structure is generated, specifying that a compensation action has been defined, and this structure is appended to the transaction structure denoted by TID. Then, in step 181 a locally unique number is returned, which can be used to cancel the command. Compensation actions are started when the transaction TID has successfully committed and must be aborted later.

On-commitment action declaration. MsgNr<-on_commitment action(TID, PID, LSYS, Site, Entry)(see FIG. 1 and block 162 in FIG. 17)

Figure 20:
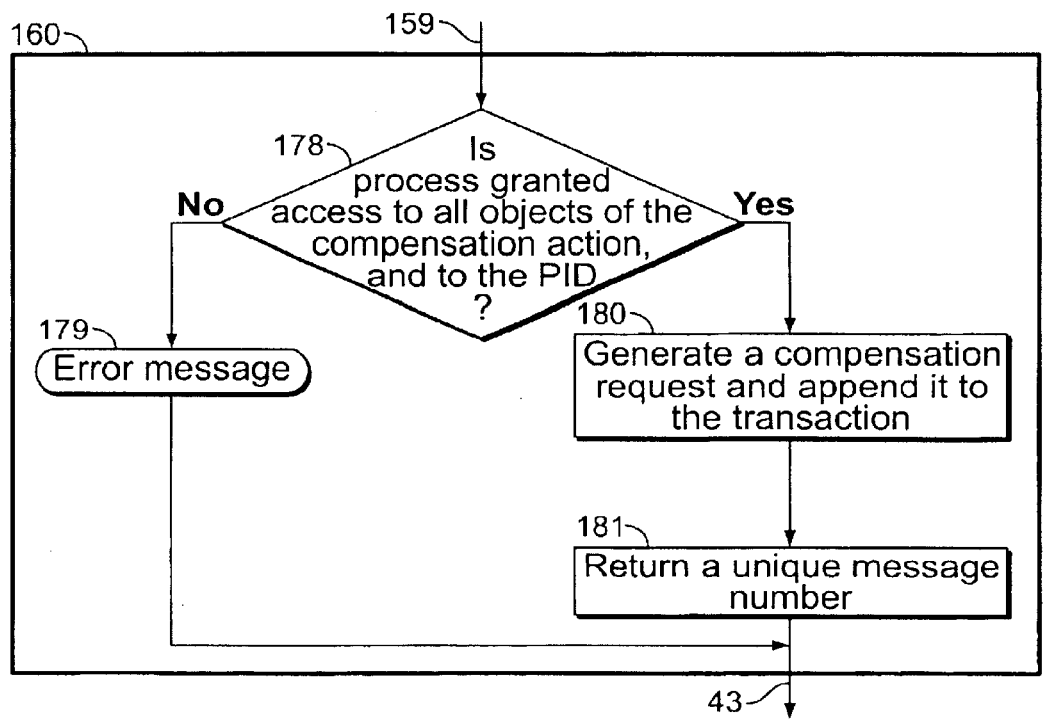

In principle, this command is similar in its control flow to the command "compensate_action" according FIG. 20, but the request structure specifies that an on-commitment action has been declared.

Initially in step 182 the access authorization of the process, concerning the objects of the on-commitment action and the PID is tested, and if access authorization is not given, an error message is returned according to step 183. Otherwise, in step 184 an on-commitment request is generated and appended to the transaction concerned, and then in step 185 a unique message number ("MsgNr") is returned. On-commitment actions are started with the commitment of TID.

Figure 22:
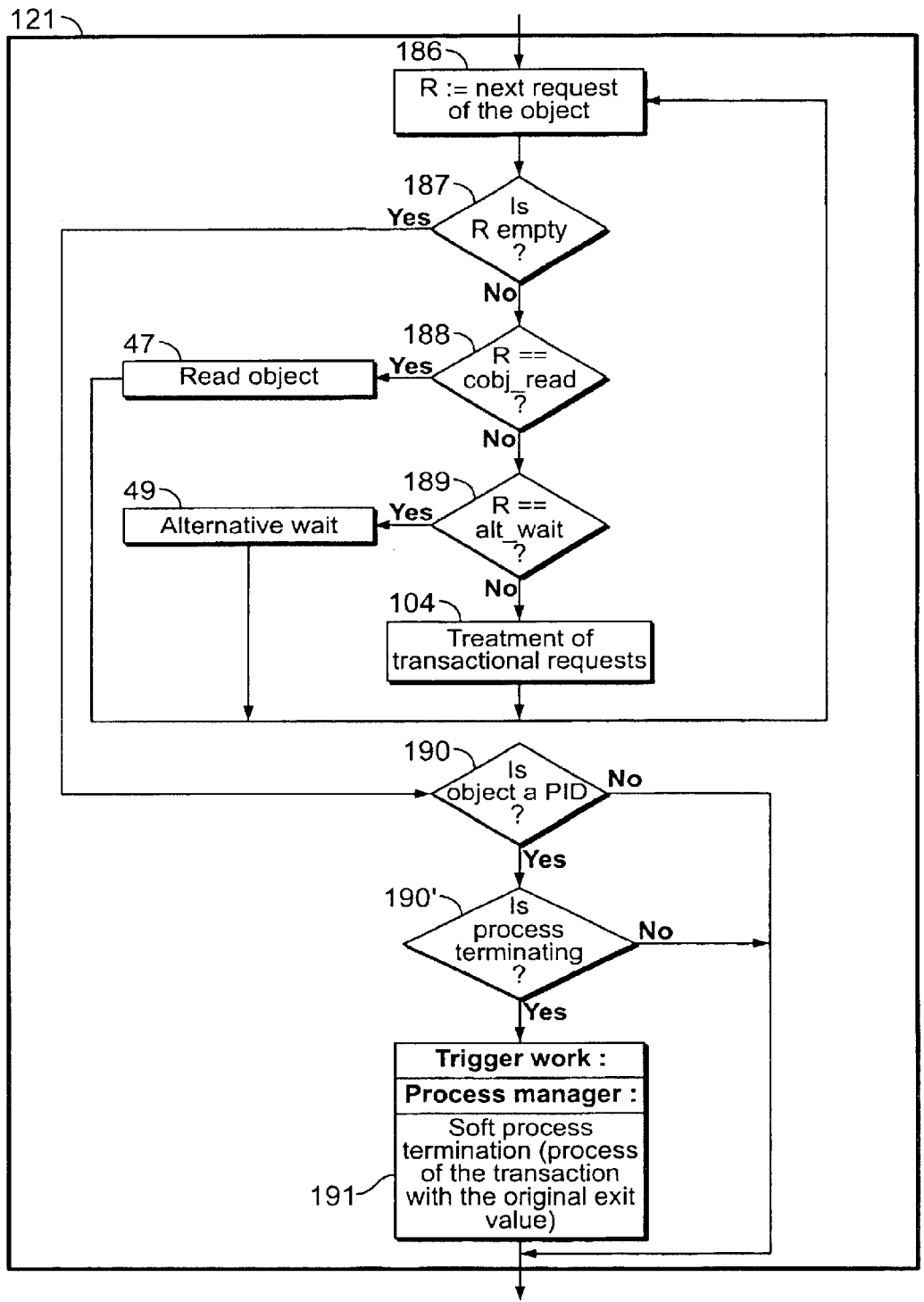

Before discussing the process requests (see block 43 in FIG. 4) and the corresponding process manager (FIGS. 25, 26 and 28 to 31) in greater detail, the wake-up of an object (compare, e.g. block 121 or 121' in FIGS. 13 and 14) and the treatment of transactional requests (see block 104 in FIG. 12) will be explained, referring to FIGS. 22 and 23.

Object wake-up: (FIG. 22; block 121)

Initially, in block 186, R is set to the next request of the object, and then at 187 it is tested whether R is empty; if not, at 188 it is tested whether R concerns the reading of an object; if yes, the procedure object read is called at block 47, and subsequently the control flow returns to step 186. If the result of the test at 188 is negative, at 189 it is tested whether R concerns an alternative wait, and if yes, the corresponding procedure 49 is called, whereafter the control flow also returns to step 186 to check the next request. If R does not concern an alternative wait, either according to block 104 transactional requests are treated (see the following explanation of FIG. 23), and then the control flow returns to step 186. If at test 187 it turnes out that R is empty (exit "Y"), then at 190 it is tested whether the object is a process identification number, and if not, the control flow goes to the exit of procedure 121; if the result of the test is positive, according to block 190' it is tested whether the process denoted by PID is terminating; if yes, the process manager is called to execute a "soft process end", see block 191, which will be described below in greater detail using FIG. 28. If the result of the test in block 190' is negative, the control flow jumps to the exit of procedure 121.

Treatment of transactional requests: (FIG. 23, block 104)

Initially, at 192, the object is dereferenced, giving O, and at 193 the relationship O<> object is tested, i.e. it is checked whether O does not equal the object. If the result of the test is positive, in step 194 the transactional requests of the object concerned are moved to O, and according to block 104' again procedure 104 for the treatment of transactional requests is called, but this time it is called for O, an then the control flow goes to the end of the procedure.

If, however, the result of the test at 193 is negative, at step 195, R is set to the next dependent process request of O, and at 196 it is tested whether R is empty. If not, at 197 it is tested whether the process has terminated, and if not, the strategy manager is called with the procedure "object shall be read", depending on the respective process identification number PID (block 58). If, however, the process has already terminated (see test 197), in step 198 the request is removed from the object, and in step 199 it is tested, whether the state of the request is "PREPARED" or "CANCELLED". If not, in step 200 the transaction commitment is aborted, the requests are removed from the objects, and the execution state is set to "FAILED", whereafter at 201 an error message is returned and the control flow goes to the exit of the procedure. If, however, the result of the test at 199 was positive, procedure 98 "transaction commitment termination" is called (with regard to the transaction of the actually treated dependent process request), and the control flow returns to step 195, to treat the next dependent process request.

If the result of the test at 196 is that R is empty, i.e. there are no more requests concerning dependent processes, in step 202, T is set to the oldest transaction of all requests of O, and at 203 it is tested, whether the state of O is "LOCKED" and whether the locking transaction is younger than T or not in the "COMMITTING" state. If not, in step 204, T is set to the locking transaction, and at 205 the strategy manager is called to execute the procedure "is object exclusively locked", which is described below using FIG. 36. If such an exclusive lock does not yet exist, the strategy manager is called (step 206, see also FIG. 35 and the following explanation) to obtain an "exclusive object lock". Then the control flow proceeds to the exit of procedure 104.

The strategy manager calls 205, 206 also follow if the result of test 203 is positive, in which case according step 207 the object locks of all requests of the locking transaction are given up in favour of T (i.e. the oldest transaction of all requests of O), the requests are again appended to the objects, and then according to 104" the procedure 104 is called for the treatment of transactional requests, i.e. with regard to all requests of the previously locking transactions. Then, as mentioned at 0.205 and at 206 if applicable, the strategy manager is called to achieve an exclusive object lock.

If it has turned out at procedure 205 that the object is already exclusively locked, in step 208, R is set to the next transactional object write request or the next transactional object read request of T on O and the request R is removed from O. Then at 209 it is tested whether R is empty, and if yes, the control flow proceeds to the exit of the procedure; if R is not yet empty, at 210 it is tested whether R concerns the writing of an object, and if yes, at 211 it is then tested whether the object to be written is a write-once object; if not, i.e. if the object is an updateable object, in step 212 the state of the object is set to "LOCKED", the desired value is tentatively written into the object, and the time stamp is incremented; the request is thus fulfilled, and the control flow returns to step 208 to treat the next request.

If, however, at test 211 the result is that the object to be written is a write-once object, at 213 it is tested whether the state of the object is "defined", and if yes, an abortion of the transaction commitment takes place according to step 200, and an error message occurs according to step 201. If, however, the state of the object is not "defined", i.e. the result of the test at 213 is negative, in step 214 it is tested whether the object state is "LOCKED", i.e. whether the object concerned is locked by another write request. If yes, the transaction commitment is also aborted according to step 200, and an error message is produced according to step 201; if not, the above described procedure, according to 212 will follow before the control flow returns to step 208.

If the test at 210, i.e. whether R is an object write request, gets a negative result, the procedure "transactional object read" is called according to block 156 (see FIG. 19 and the corresponding description), whereupon it is tested at 215 whether the read request could be answered. If not, the control flow returns to step 208, if yes, the state of the object is set to "LOCKED", the request is fulfilled, see block 216, and the control flow also returns to step 208.

FIG. 24 illustrates the control flow of the process request (see block 43 in FIG. 4) in detail. Initially at 217 it it tested whether the request concerns an independent process (indep_process), and if yes, the process manager mentioned above in the context of FIG. 13 is called for the start of an independent process, block 127. If the request, however, does not concern an independent process, at 218 it is tested whether the request concerns the sending of signals, and if yes, at 219 the process manager is called with the procedure "send signal" (see FIG. 27, explained below). Otherwise, at 220 it is tested whether the request concerns a "soft process end" (coke_try_exit), i.e. the termination of a process with permission check; if yes, at 191 the process manager is called for the execution of the "soft process end" of this process; if not, at 221 it is finally tested whether an unconditional termination of the process ("coke_exit") is concerned, and if true, the process manager is called to execute the procedure "process end". The procedures "soft process end" and "process end" will be described below in greater detail, using FIGS. 28 and 29.

The above mentioned processes and the processes "process creation" and "process spawning" are now explained using FIGS. 26 to 31.

Figure 26:
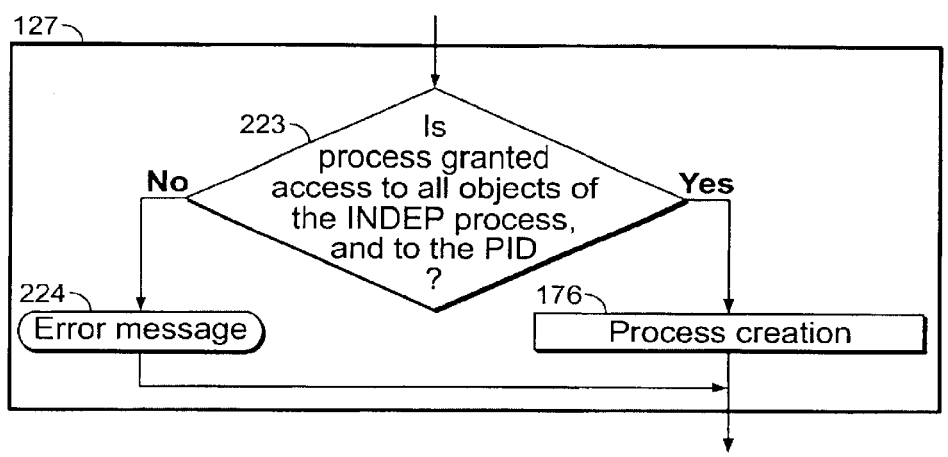

Start of an independent process, INDEP process start: indep_process (PID, LSYS, Site, Entry) (see FIG. 26)

With this command, an independent (=autonomous) process is started, which is uniquely identified by a PID number (process identification number). This PID number is also a communication object by itself, the value reflecting the execution state of the process. The process is started at the computer at location "Site" (X, Y or Z in FIG. 2) at the local software system LSYS (18, 19 or 20), where it is checked (see step 223 in FIG. 26) whether the process at issue possesses access authorization to all objects appearing in "Entry" and to the PID (and whether these objects and the PID are compatible regarding the strategy used, whether "Site" is a valid site address, and whether TID denotes a running (STARTED or FAILED) transaction); if this is not fulfilled, according to step 224 an error message is created. If the PID is already in use as a PID, an error message occurs, too.

"Entry" specifies the function to be executed, to which communication objects may be added as arguments this new process 1 then also authorized to see.

According to block 176 (see also FIG. 30, below), a new process structure is generated if the process is to run at the local site, and the process is started locally; otherwise the strategy manager is called by PID to send the process to the computer specified as "Site". The reliability of the process start depends on the actual distribution strategy. Moreover, an aide transaction is generated, which is noted as the transaction of this process in its process structure.

If an independent process belongs to a reliable distribution strategy (protocol flag "RELIABLE"), it is, recovered after a system failure, and if it has not yet terminated, it is also automatically recovered.

Independent processes are started by the coordination server until a final execution state is reached.

Figure 27:
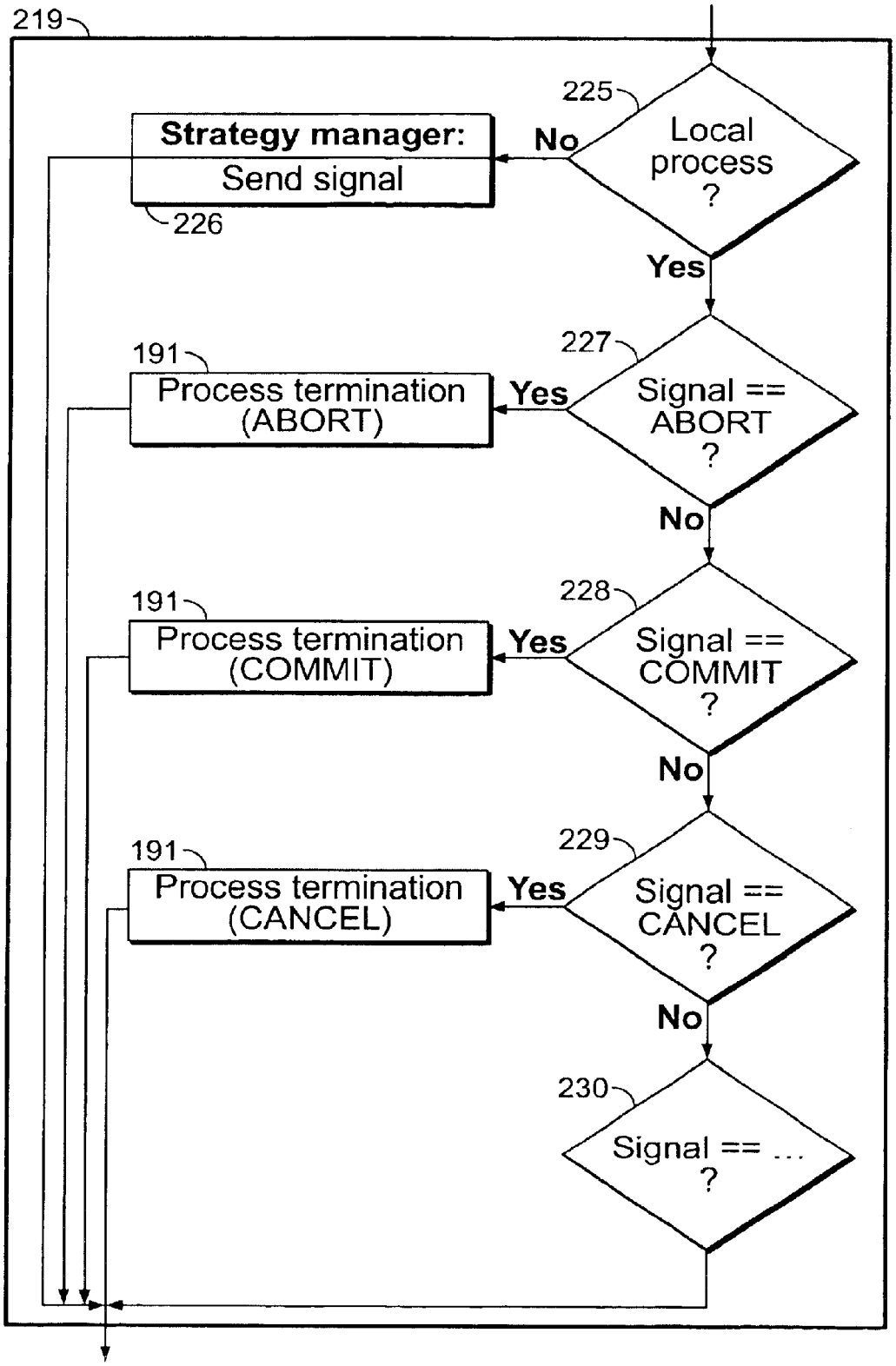

Sending of signals: signal (PID, Signal) (see FIG. 27)

With this request a specified signal (e.g., "ABORT", "COMMIT", or "CANCEL", etc.), for which optional flags can be specified, e.g. specifying whether the signal shall be passed to subprocesses, is sent to the process, which is denoted by the PID number. In the called procedures it is suitably tested whether PID is a communication object, denoting a process, and whether it is a valid signal (for example, a user must not send the signal "ABORT" to a dependent process ("dep_process") which is already "PREPARED"). If the process denoted by PID runs on a remote site (see test 225 in FIG. 27), the strategy manager, given by PID, is activated to send the signal to the agent of the remote site (block 226, procedure "send signal"; see FIG. 38 below), which will send it to the corresponding process there. The reliability of sending depends on the distribution strategy ("RELIABLE" or "UNRELIABLE"). Moreover, according to FIG. 27, at 227, 228, 229 and 230 the individual signals are checked for their subject ("ABORT", "COMMIT", "CANCEL", etc.), and if applicable, the corresponding "process end" is called with the corresponding exit value ("ABORT" or "COMMIT" or "CANCEL"), block 191, which will be illustrated below using FIG. 28.

Figure 28:
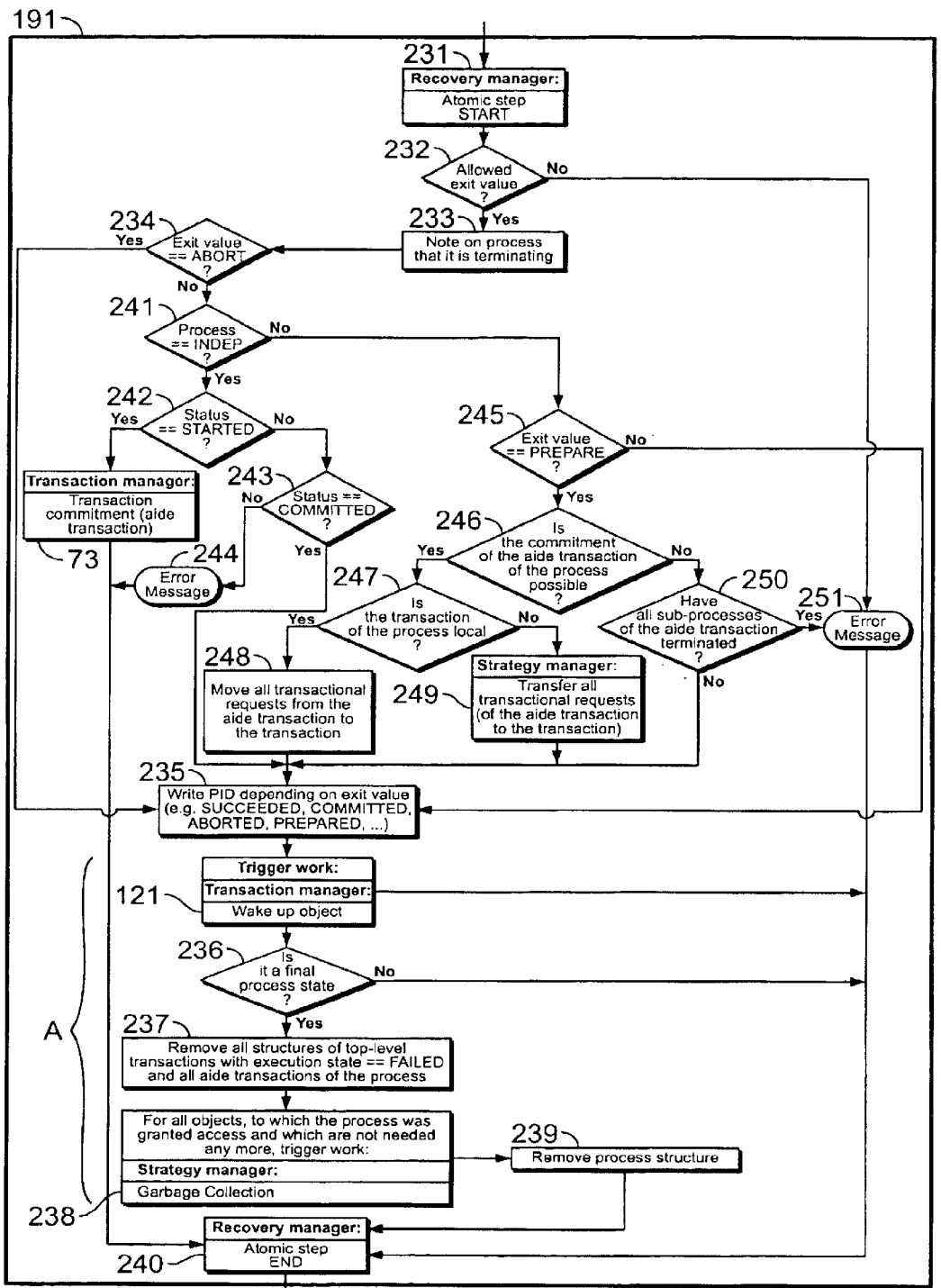

Process termination with permission check (soft process end): coke_try_exit (ExitValue) (see FIG. 28)

This command serves to terminate a current process, where "ExitValue" can take values analogously to the signal types. The reached execution state is written into PID. If the desired state is not reachable, then "coke try exit" returns an error message. It is therefore—after an "atomic step START" 231—initially tested whether the exit value is allowed (test 232); this depends on whether "coke_try_ exit" has been called by the user or by the system. The latter is, for example, the case if internally a signal "ABORT" or a signal "COMMIT" is sent to a process.

Allowed are: exit value—by whom—in which type of process where the execution state is either not yet set or has the explicitly given value):

e.g. "PREPARE" from the user to an independent or dependent process;

or "COMMIT" from the user to an INDEP process (not yet set or SUCCEEDED) or by the system to a DEP process (PREPARED);

or "ABORT" from the user to an INDEP process (not defined or SUCCEEDED) or to a DEP process or from the system to a DEP process (not defined or PREPARED);

or "CANCEL" from the user to a DEP process (not defined or PREPARED).

Afterwards it noted on the process that it is terminating (block 233).

If the exit value is "ABORT" (see test 234 in FIG. 28), after writing of the PID (block 235) the atomic procedure "coke_try_exit" is terminated as follows (hereinafter referred to as procedure A): all sleeping requests for PID and a potential process end of a father process are woken up (block 121): transaction structures of failed top-level transactions of this process no longer needed are removed (block 237) after checking whether a final process state has been reached (step 236); the reference counters of all objects to which the terminating process had authorized access are decremented for garbage collection, block 238 (see also FIG. 40) (depending on the protocol of the PID of the process); the process structure is removed (step 239), and then the atomic step END (recovery manager) follows (block 240). If it is an independent process ("indep process") (see test 241, exit Y), the state is tested at 242, and if the state of the aide transaction is "STARTED", the soft transaction commitment "trans_try_commit" is called by its aide transaction (block 73).

If the state of the aide transaction is "COMMITTED" (test 243), the execution state of the process is set to "SUCCEEDED" (if the exit value is "PREPARE") in block 235 (optionally "PREPARED" may be used, too), and if the exit value is "COMMIT", the execution state of the process is set to "COMMITTED", and the above described procedure A is applied. If at the test 243 the state is not "COMMITTED", an error message occurs (step 244). If it is a dependent process ("dep_process") negative result at test 241), then:

if the exit value is "PREPARE" (test 245), the execution state of its aide transaction is computed (which can not be determined if a subtransaction or a dependent process of the aide transaction has not yet terminated; it is all only right if all subtransactions and all dependent processes have succeeded, otherwise it is not); the soft transaction commit is delayed to wait (see test 246) until the state can be determined; if it is not all right, an error message is returned; otherwise, all transactional requests of the aide transaction of the process are transferred to the transaction of the dependent process (block 248); if this transaction is not local (see test 247), the transfer must be performed by the strategy manager (according to the PID of the process) (see block 249; compare also with FIG. 39); only then the termination state of the process is set to "PREPARED" (block 235), and procedure. A will follow.

If all subprocesses of the aide transactions have terminated (see test 250) after it turned out that a commitment of the aide transaction was not possible (test 246), an error message occurs (step 251); otherwise, procedure A will follow.

if the exit value is not "PREPARE" (see test 245), it must be "ABORT", i.e. the termination state of the process is set to "ABORTED" (block 235) and procedure A is applied.

Figure 29:
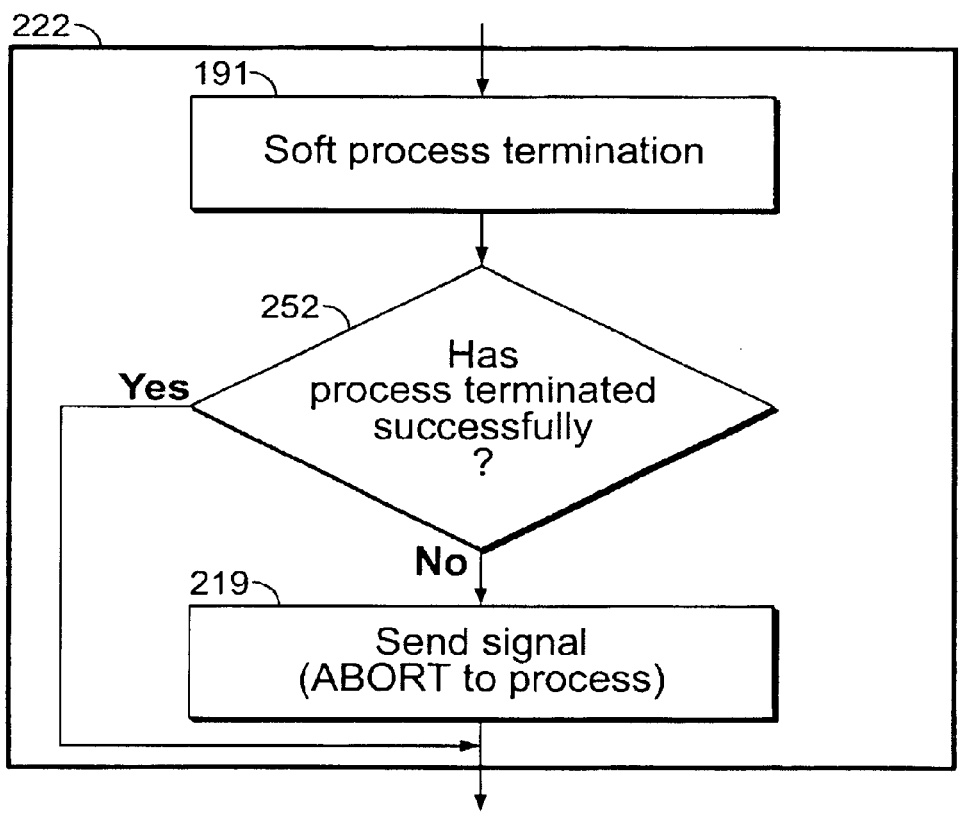
Figure 30:
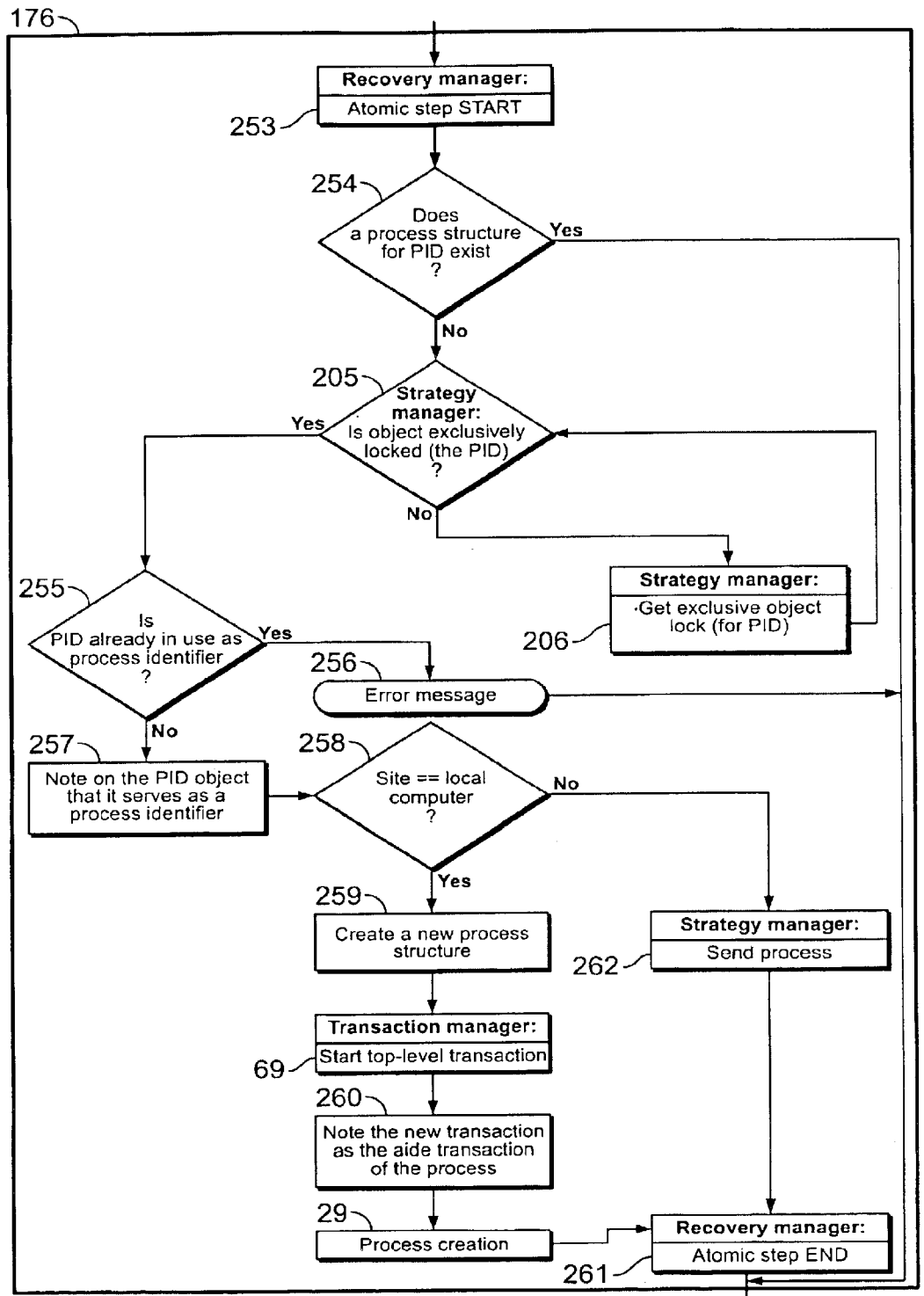
Figure 31:
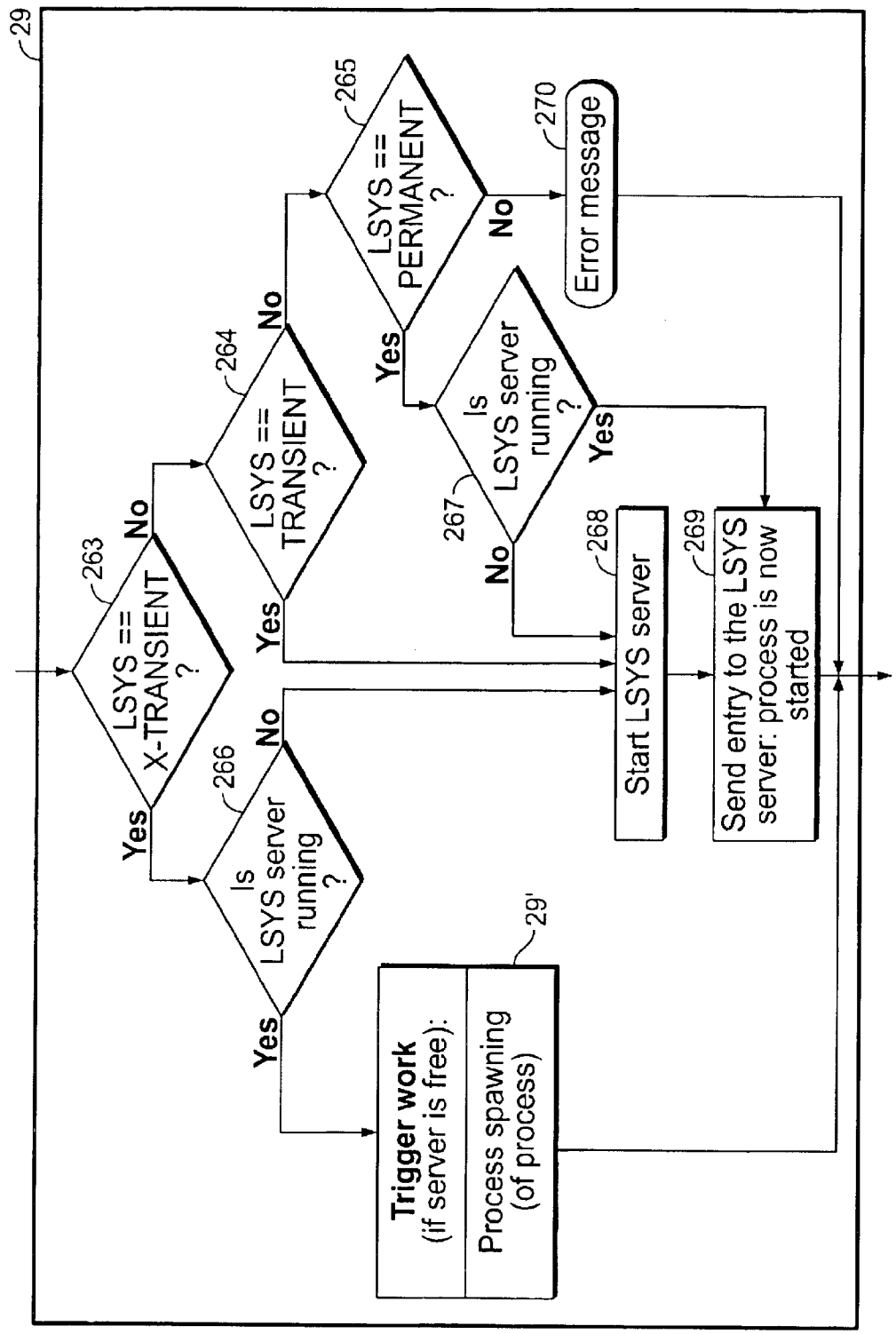
Figure 32:
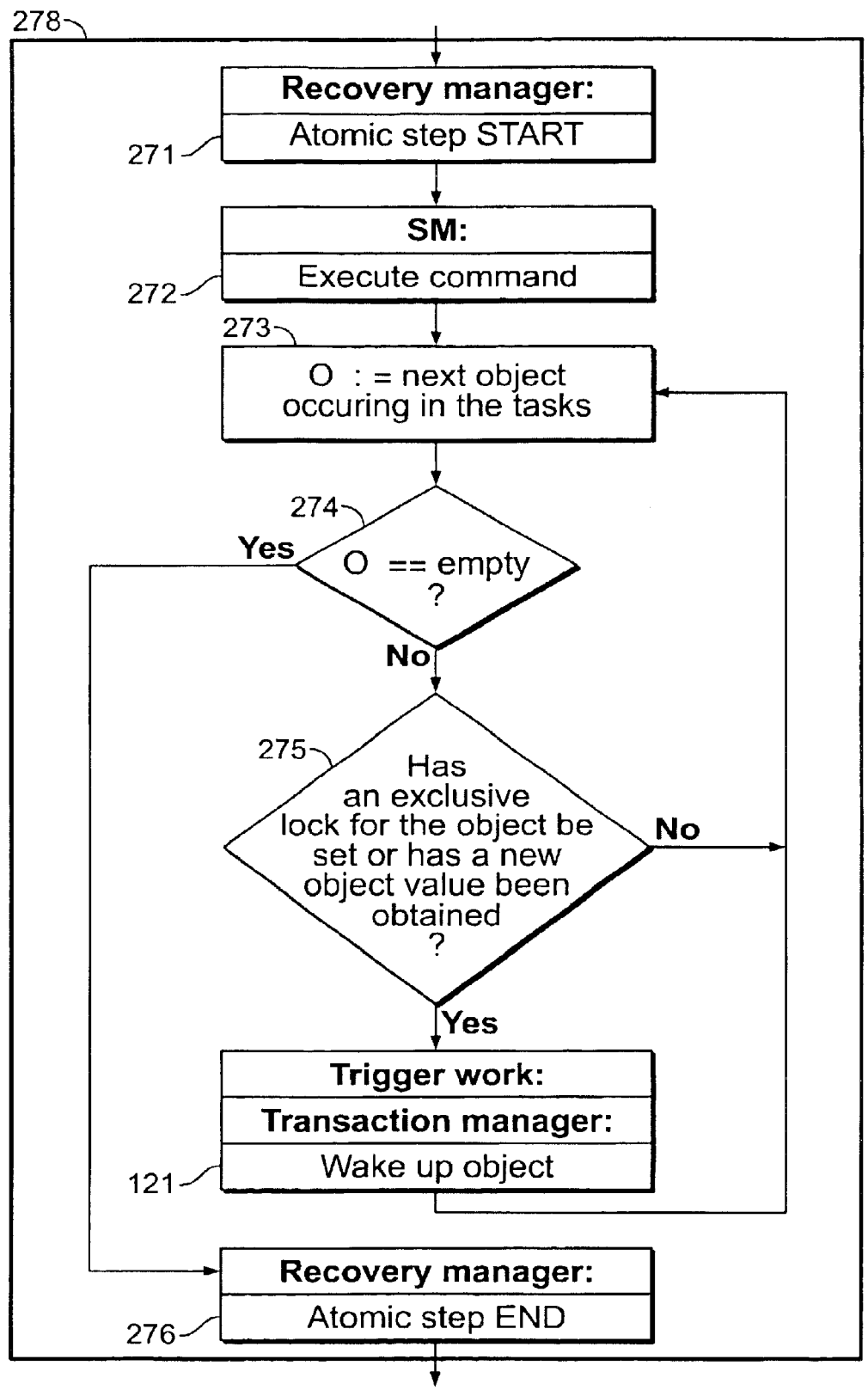
FIGS. 32 to 40 show the strategy manager, i.e., several procedures defining a so-called distribution strategy (a communication protocol).
Figure 33:
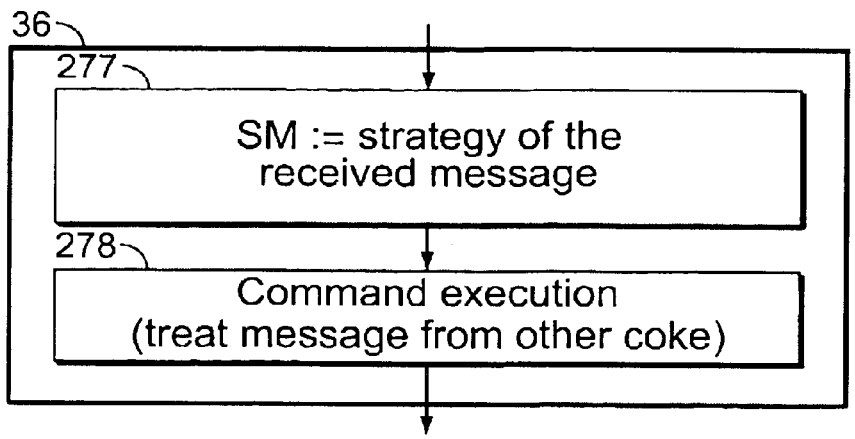

Termination of a process: coke exit (ExitValue) (see FIG. 29)

The control flow is the same as for "soft process end" (see above and block 191 in FIG. 28), but in case of failure the process (see test 252) is automatically aborted, i.e. the signal "ABORT" is automatically sent to the current process (block 219 "send signal", "abort" a process).

Figure 36:
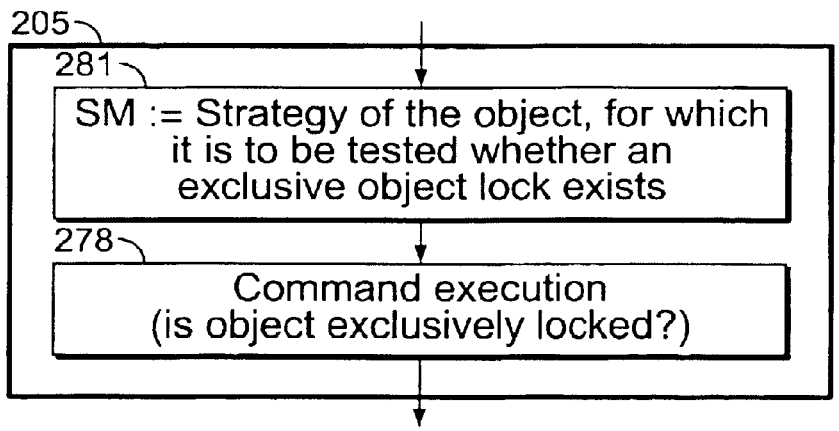

Process creation: create_process (see FIG. 30) After an initial call of the recovery manager concerning "atomic step START" at 253, it is tested at 254 whether a process structure already exists for the process having the given number; if yes, the control flow proceeds immediately to the process end; if not, the strategy manager is called to determine whether the object is exclusively locked, see block 205 and FIG. 36, which will be discussed below. If not, the strategy manager is called to obtain an exclusive object lock for the process at issue according to block 206 (see also FIG. 35), and the control flow returns to step 205 in FIG. 30, from where, as the object is now exclusively locked, the control flow can proceed in the procedure, and test at 255 whether the specified process identification number PID is already in use for the identification of a process. If this is the case, at 256 an error message is returned, and the end of the process is reached. If the PID number is not yet in use, now in step 257 it is marked on the PID object that it represents a PID, i.e. it serves from now on to identify this process. Depending on whether the process shall be executed on the local site (test 258), the required new process structure is created, block 259, if the local site is responsible, and the transaction manager is called to start a top-level transaction according to block 69 (see also FIG. 10); then the new transaction in step 260 is recorded as the aide transaction of the process concerned; then "process spawning" 29 (see also FIG. 31) is called; finally, the recovery manager is called to execute "atomic step END", see block 261 in FIG. 30. If it turns out at test 258, that the process is not to be executed at the local site, the strategy manager is called to execute the procedure "send process" according to block 262, whereafter the end step 261 follows, too. Procedure 262 "send process" is described below in greater detail using FIG. 37.

Process spawning. (see FIG. 31)

When a process is spawned, depending on whether the local software system is transient or permanent (tests 263—"is software system X-transient ?", 264—"is software system transient ?" and 265—"is software system permanent ?") and depending on whether the local server runs (tests 266, 267), either the local server is started in step 268 to send the entry data to the server and to start the process according step 269, or the latter step 269 is executed immediately in case of a permanent local software system, if the server is already running. In case of an x-transient local software system (test 263), if the server is already running (see test 266), triggering of the required work is effected, if the server is free, and for this purpose the procedure "process spawning" is executed again in a loop according to block 29'. If the local software system is neither x-transient nor transient nor permanent, according to step 270 an error message is returned.

Finally, using FIGS. 32 to 40, the strategy manager will be described, which is responsible for the establishment of the distribution strategy, also called communication protocol.

Request Execution; (see FIG. 32)

With the execution of a request, messages can be sent to other coordination servers, which is controlled by the corresponding distribution strategy. In the control flow according to FIG. 32, after the "atomic step START" of the recovery manager in 271 the strategy manager of the strategy concerned is called to execute the request (block 272), and then in step 273 O is set to the next object occurring in the work list, and in step 274 it is tested whether 0 is empty. If O is not empty, and if an exclusive lock has been set for the object or a new object value has been obtained (test 275), the transaction manager is called to wake up the object, block 121 (see also FIG. 22). Depending on the distribution strategy (SM), after block 274 it may also be tested whether there was an object lost message for the object (because of a fatal error), and then transaction abortion is called in the transaction manager (for the sake of simplicity, this is not shown in FIG. 32). If, according to test 274, there are no object left, the recovery manager executes "atomic step END" in block 276.

Treat message from another coordination server: (CoKe) (see FIG. 33)

Initially, in step 277, the strategy of the received message is kept, and then according to block 278 the procedure "request execution" (FIG. 32) is called for the treatment of the message received from a CoKe.

Object shall be read: (see FIG. 34)

Initially, the strategy of the object to be read is kept in step 279, and then in block 278 the procedure "request execution" is called, because an "object shall be read".

obtain exclusive object lock: (see FIG. 35)

After initially the strategy of the object for which the exclusive lock is to be obtained is kept (step 280), in block 278 the procedure "request execution" is called to obtain an exclusive object lock.

Is the object exclusively locked: (see FIG. 36)

After keeping the strategy of the object for which it shall be tested whether an exclusive lock exists, according to step 281 the procedure "request execution" (block 278) follows again, this time for the test whether the object is exclusively locked.

Figure 37:
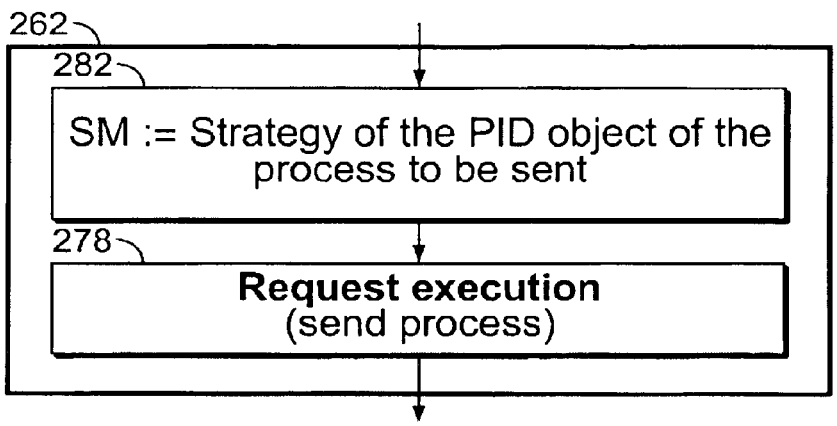
Figure 38:
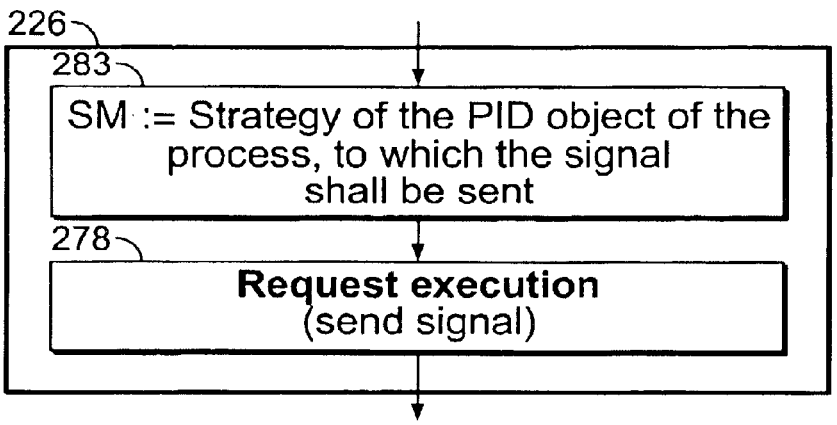

Send Drocess (see FIG. 37)

Initially, in step 282 the strategy of the PID object of the process to be sent is kept, then in step "request execution" 278 the process is sent.

Send signal: (see FIG. 38)

Here the strategy of the PID object of the process is kept, to which the signal is to be sent (step 283), before, according block 278, the signal is sent.

Transfer transactional requests: (see FIG. 39)

Figure 39:
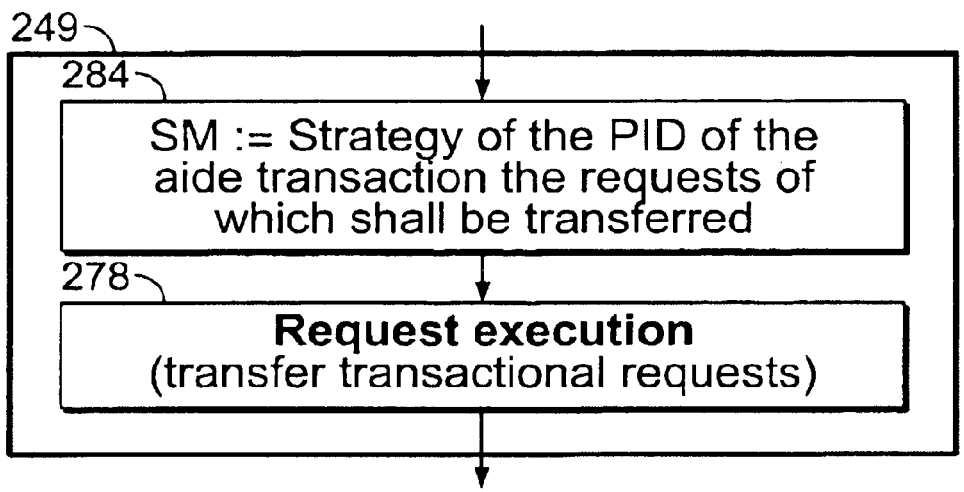
Figure 40:
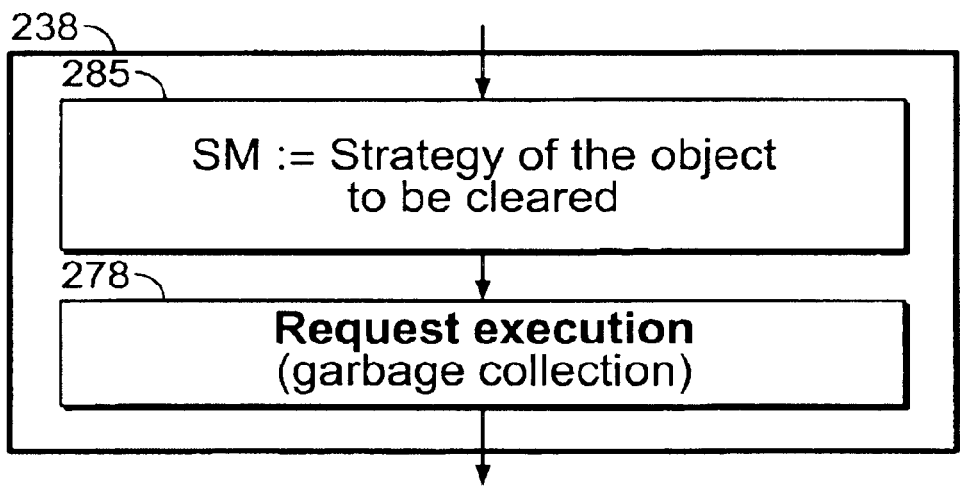

Before according to step 278 the request is executed and transactional requests are transferred, the strategy of the PID of the aide transaction, the request of which shall be transferred, is kept; see step 284 in FIG. 39.

Garbage Collection: (see FIG. 40, procedure 238 in FIG. 28)

The strategy of the object to be collected is kept (step 285), before the garbage collection takes place by executing the request, block 278.

As to the available strategies, preferably a basic strategy is selected and generally used. Basic strategies can, for example, be PR_DEEP and AR_FLAT; PR_DEEP denotes a passive replication with a deep object tree; AR_FLAT means active replication with a flat object tree and offers even more reliability and availability than PR_DEEP. As strategy flags (protocol flags), the flags RELIABLE/ UNRELIABLE; MOBILE/NON_MOBILE; GARBAGE COLLECTION/NO_GARBAGE_ COLLECTION; SECURITY / NO_SECURITY; TOPOLOGY_GRAPH/NO_TOPOLOGY_GRAPH, having the following meanings can be used, among others.
RELIABLE/UNRELIABLE: whether critical state changes shall be stored in data and log file to allow recovery;
MOBILE/NON_MOBILE: whether a computer can be removed intentionally from the network during run time;
GARBAGE_COLLECTION/NO_GARBAGE COLLECTION: whether the object is to be cleaned automatically, when it is no longer needed;
SECURITY/ NO_SECURITY: whether it is to be checked if a process is granted access authorization to an object;
TOPOLOGY GRAPH/NO_TOPOLOGY_GRAPH: whether a topology graph is to be administrated as an aide structure, where information is stored, on which sites copies of the object exist, and thus optimizes the replication behavior for very large objects.

The application of the present and its system the advantages will now be illustrated by means of two examples:

EXAMPLE 1

Producer-Consumer

A classical example for the administration of shared resources is the consumer-producer problem, where an arbitrary number of distributed, parallel-running processes exist, which either produce or consume data. All produced data shall be equally consumable by all consumers (i.e. without preference), and as soon as a data item has been consumed, it must not be consumed again.

A solution based on write-once communication objects by means of the described coordination system, uses as a common data structure an infinitely growing list into which the produced items are written one after the other (such a list is termed "stream"). The beginning of the list is represented by a communication object termed "Root", into which the first producer writes a list cell in a transaction, which consists of two elements, namely a head and a tail. The producer writes in the same transaction its data item into the head and a newly created communication object, termed "flag", the meaning of which will be explained below. Into the tail the producer writes in the same transaction a further, newly created communication object, termed "ListTail". "ListTail" represents the rest of the list, i.e. the next producer in a transaction will again write a list cell containing its data item, a new flag and a new "ListTail", into "ListTail" and so on; see table 1 below:

TABLE 1

```
Data organization as stream:
                 List cell
       <==================================>
List = [ (DataItem1, Flag1) | ListTail1 ]
       <=================>   <==========>
        Head of the list    Tail of the list
ListTail1 = [ (DataItem2, Flag2) | ListTail2 ]
ListTail2 = [ (DataItem3, Flag3) | ListTail3 ]
and so on
i.e. List = [ (DataItem1, Flag1) , (DataItem2, Flag2) ,
(DataItem3, Flag3) ,
               . . . , ListTailN ]
```

The synchronization of concurrent write accesses of several producers PR1, . . . , PRk to the same ListTail works as follows: as each producer PRi (i=1, . . . , k) tries to write to the communication object, which represents the ListTail, in a transaction T1, . . . , Tk, only one of these transactions can succeed (commit). If, for example, the j-th transaction Tj was successful, i.e. the producer PRj has successfully written its data item to the stream, all other producers PRi (i=1, . . . , and i<>k) must cancel the write request of the ListTail, in their corresponding transaction Tj (cancel request), must read the new contents of the ListTail, must extract the new ListTail from it and must now try to write the desired list cell with the produced data into the new ListTail (as a newly issued write operation in transaction Tj). Assuming that there are not always two producers trying at the same time to write to the same ListTail, it is guaranteed that each producer can make its data available in the shared stream.

To consume a data item., the corresponding consumer Ki reads the stream until it finds an entry in which the "Flag" is still undefined, which means that no consumer has consumed the data so far. The consumer Ki starts a transaction and tries to write the value "done"into Flag. If the commitment of the transaction succeeds, the consumer Ki may process the data item. If the transaction commitment does not succeed, this means that currently another consumer has consumed this data item, and the consumer Ki must withdraw the write operation on "Flag", must read the next list cell from the current ListTail and—if the communication object "Flag" is still undefined there—it must now try again to set "Flag" to "done" in the transaction. Thus, concurrent consumer accesses to the same data item are synchronized, and it is guaranteed that each data item is processed by no more than one consumer.

Each producer and consumer process, which is passed the root communication object of the list (start of the list), as argument, is started as independent process. Thus, each of these processes has access to all data items produced/consumed.

The fault-tolerance can be tuned at creation time of all used communication objects: Assuming that a distribution strategy (see tables 2, 3, and 4, strategy PRX) has been selected for these communication objects, with option "RELIABLE" set. Then the described producer-consumer system is resistant against system failures as well as against network failures. If a site crashes, the local coordination server is re-started, which recovers all communication objects as well as all producer and consumer processes and starts the latter with the original root communication object as parameter. Thus, each of these processes can again get access to all produced data items in the stream and can start working again. A consumer now reads the stream until the first data item, the corresponding flag of which is still undefined; a producer tries to write to the stream, starting from the root communication object at the first ListTail, then the second ListTail, etc.; a transaction commitment failure will occur with each communication object already written, the producer therefore cancels the write operation, over-reads the written communication object and tries again at the next ListTail, until it reaches the end of the list and can deposit its data item there. A useful optimization for this recovery case is that the logic of the producer is extended so that it always tests (using blocking read), whether a ListTail is already defined, before it issues its write operation on it, and that it over-reads it immediately, if the ListTail is already defined. Network failures are masked with "RELIABLE" as well as with "UNRELIABLE" strategies, but the latter can guarantee for this only as long as no system failures (computer failures) occur. Therefore, usually "UNRELIABLE" strategies; will show a better performance i.e. the user can, depending on the application requirement, tune the fault-tolerance / performance on the communication object: the programming system representing the producers and the consumers always remains identical. Further adjustment possibilities are, e.g., related to availability and replication behavior (i.e. at which site communication objects actually use disk space).

In table 2 below the logic of the producer, to which the communication object ROOT has been passed, is shown in a procedural pseudo notation, the previously mentioned names are given for the single functions here only by way of an example (but not in the following tables).

TABLE 2

```
PRODUCER (ROOT)
    O := ROOT
LOOP_1:
    CREATE NEXT DATA ITEM
    CREATE TWO NEW COMUUNICATION OBJECTS FLAG AND
    LIST
TAIL
OF STRATEY PRX
        (" creation of communication objects" )
        START A NEW TOP-LEVEL TRANSACTION (= T)
        (" top-level transaction start" )
LOOP_2:
    IF THE NON-BLOCKING READ (" read of an object" )
SUCCEEDS
        LET THE READ VALUE BE THE LIST CELL [ HEAD |
TAIL ]
        O := TAIL
        GOTO LOOP_2
        WRITE THE VALUE [(DATA_ITEM, FLAG) | LIST
_TAIL) INTO O
            (= " operation OP1" )          (" object
write" )
    TRY TO COMMIT T (" weak transaction commitment" )
    IF THE COMMITMENT OF T SUCCEEDS:
        O := LIST_TAIL
        GOTO LOOP_1
    ELSE
        CANCELLATION (" cancel" ) OF THE WRITE
OPERATION (OP1) OF O IN T
        GOTO LOOP_2
```

Table 3 shows the logic of the consumer to whom the communication object ROOT has been passed, is shown using a procedural pseudo notation:

TABLE 3

```
CONSUMER (ROOT)
    O := ROOT
LOOP_3:
    START A NEW TOP-LEVEL TRANSACTION (= T)
LOOP_4:
    BLOCKING READ OF O:
        LET THE READ VALUE BE THE LIST CELL
    [ (DATA_ITEM, FLAG) | LIST_TAIL ]
        O := LIST_TAIL
        IF FLAG IS DEFINED
            GOTO LOOP_4
        ELSE
            WRITE IN T THE VALUE " DONE" INTO FLAG (=
OPERATION OP2)
        TRY TO COMMIT T (" soft transaction commitment" )
        IF THE COMMITMENT OF T SUCCESS
            PROCESS DATA_ITEM
            GOTO LOOP_3
        ELSE
            CANCELLATION OF THE WRITE OPERATION (OP2) TO
FLAG IN T
            GOTO LOOP_4
```

Table 4 below shows the starting of N producer processes and M consumer processes on the computers R1, . . . , RN and R1, . . . , RM:

TABLE 4

```
CREATE A NEW COMMUNICATION OBJECT ROOT OF STRA-
TEGY PRX
START INDEPENDENT PROCESS PP1 AT SITE R1; LET THE
FUNCTION TO BE
EXECUTED BE PRODUCER (ROOT)
START INDEPENDENT PROCESS PP2 AT SITE R2; LET THE
FUNCTION TO BE
EXECUTED BE PRODUCER (ROOT)
. . .
```

TABLE 4-continued

START INDEPENDENT PROCESS PN AT SITE RN; LET THE FUNCTION
TO BE
EXECUTED BE PRODUCER (ROOT)
START INDEPENDENT PROCESS CP1 AT SITE R1; LET THE FUNCTION TO BE
EXECUTED BE CONSUMER (ROOT)
START INDEPENDENT PROCESS CP2 AT SITE R2; LET THE FUNCTION TO BE
EXECUTED BE CONSUMER (ROOT)
. . .
START INDEPENDENT PROCESS CPM AT SITE RM; LET THE FUNCTION TO BE
EXECUTED BE CONSUMER (ROOT)

This example also demonstrates the possibility to specify ever lasting processes: the producer processes as well as the consumer processes run forever and survive system as well as network failures, provided that a "RELIABLE" distribution strategy has been selected.

The addition of new producers and consumers (at distributed sites) is dynamic ("dynamic scale-up" through the start of a process at the respective site, to whom the root communication object is passed as parameter.

Authorization is dependent on the selected distribution strategy in that only a process explicitly started as consumer or producer gets access to the stream data. Assuming that in the distributed environment other parallel running processes exist, none of these processes may access the stream data, even if it "guesses" the object identification number of an object contained in the stream by chance, it is assumed that this communication object neither appears in the parameter list passed to it nor has been written as a subobject into a communication object accessible for this process, nor has been created by this process.

Known tools for distributed programming do not allow such a simple and short specification of this classical problem, where the programmer is completely liberated from hardware and software aspects and nevertheless has the possibility to adapt the performance etc. of the program entirely to the given application requirements.

The producer/consumer problem can be found as a basic pattern of a wide range of distributed application problems, such as, for example distributed banking, where the shared bank safes of distributed counters are administrated as a stream, or the administration of work flow data.

EXAMPLE 2

Travel Reservation

A trip is to be arranged, and the following reservations are needed: a flight from Vienna to Paris, a hotel room in Paris and a car in Paris. The flight can be booked at one of the three airlines A, B, or C. The hotel room can be booked at either hotel H or hotel I. The car can be booked at car rental company V or W. It is assumed that the client does not have any reservation preferences. Moreover, a flight reservation can be cancelled. In this case a "reservation reversion" is to be called as compensation action at the corresponding airline database. Therefore, it is not necessary to require that the local database system of the airline offer a 2-phase-commitment, i.e. the flight reservation transaction can be closed as soon as possible, so that the local airline database is not blocked too long by the global travel reservation transaction.

Hotel room reservation and car reservation transactions should not be compensatable, i.e. it must be demanded that the corresponding databases support a 2-phase-commitment and are able to hold locks at the data concerned until commitment of the global travel reservation transaction.

In the present coordination system, several possibilities exist to solve this problem, offering different degrees of parallelism. The solution shown below offers maximum parallelism.

The entire travel reservation is represented as transaction T. All airline flight reservations are started in parallel as independent processes (which commit autonomously) executing the help function C_RESERVATION. C_RESERVATION stands for "compensatable reservation. It must be noted that independent processes implicitly start a new top-level transaction, which is termed "aide transaction of the independent process" and is either automatically aborted or committed dependent on the specified exit value of the process. The function C_RESERVATION starts the transaction "reservation" in the database of the corresponding institution. If the reservation has been executed in the database systems DBS (and immediately committed), C_RESERVATION declares the action "reservation reversion" as compensation action in the transaction of the independent process (i.e. if this process is cancelled or aborted, after it has successfully terminated, this action is executed automatically) and terminates the process withthe exit value "PREPARE" This means that the process is still waiting for one of the signals "ABORT" "CANCEL" or "COMMIT". The behaviour of the process in case of the first two signals is, as already mentioned, the abortion of its transaction, which triggers the execution of the compensation action "reservation reversion in DBS". A signal "COMMIT" closes the work of the process so that from now on it will not accept any more signals; the reservation is finally closed.

The hotel room and car reservations are also started in parallel, but as dependent processes executing the function "NC_RESERVATION" ("non-compensatable reservation"). This function starts the transaction reservation" in the database of the corresponding institution. If the reservation in database system DBS is successful, the DBS reports "1 DB_READY" i.e. DBS waits until it receives a "DB_COMMIT" or a "DB_ABORT". Only after a "8 DB_COMMIT" the changes in the DBS become visible. If the DBS returns "DB_READY", NC_RESERVATION declares "DB_COMMIT" in DBS as on-commitment action in the current process, i.e. this on-commitment action refers to the transaction of the current process, which, in case of a dependent process is the transaction by which the process was called transaction T in the example. This on-commitment action is therefore started if and only if the transaction succeeds.

After all reservations have been started as parallel running processes, transaction T synchronizes these processes. For this two help functions are used:
"WAIT_FOR_INDEPENDENT_PROCESS" and
"WAIT_FOR_DEPENDENT_PROCESS". Both functions use the blocking "alternative waiting" (ALT_WAIT) construction to wait for all passed process identifiers (PIDs), which are communication objects. As soon as a process terminates, it automatically sets its PID to the termination state specified via the exit value of the process. If the desired exit value is "PREPARE", and the process is an independent (or dependent) process, the PID is set to "SUCCEEDED" (or to "PREPARED"), if the aide transaction of the independent process could terminate successfully (or if the aide transaction of the dependent process still has a chance to commit). The value of the PID is now tested, if ALT_WAIT becomes active.

If the terminated process was successful, the aide function WAIT_FOR_INDEPENDENT_PROCESS sends the signal "ABORT" to all other processes, declares the sending of the signal "COMMIT" to the successful process as on-commitment action of the transaction T (i.e. the triggering of "DB_COMMIT" is delegated to transaction T) and returns "OK". Otherwise, the aide function WAIT_FOR_INDEPENDENT_PROCESS sends the signal "ABORT" to the process which has activated ALT_WAIT, but has not terminated successfully, and starts an ALT_WAIT again for all other processes.

The help function WAIT_FOR_DEPENDENT_PROCESS behaves as follows: if the terminated process was successful, the help function WAIT_FOR_DEPENDENT_PROCESS cancels all other dependent processes with regard to T and returns "OK". This cancellation on the one hand removes the dependent process from the actions T must execute (as if this dependent process has never been called by T—this demonstrates the property of cancellation ("backtracking in a transaction") of the coordination system) and on the other hand also sends the signal "ABORT" to the process, which in turn causes the abortion of all direct subtransactions of T, in the current situation of Ti, i.e. the compensation action (=DB_ABORT in DBS, which is still waiting in the 2-phase-commitment) of transaction T1 is executed, because T1 had already terminated successfully. If the terminated process was not successful, the help function WAIT_FOR_DEPENDENT_PROCESS cancels the dependent process (this is another application of "backtracking in a transaction") referring to T and starts another ALT_WAIT for all other processes.

This example demonstrates how the coordination system can serve as a control system for real database transactions, where the databases may be autonomous, i.e. different with respect to the supported transaction mechanism. In particular, it was shown that databases having a traditional 2-phase-commitment and databases which do not have this property can be coordinated within one single global transaction, where the property of the coordination system to relax the isolation of the transaction is employed.

Moreover, it is demonstrated that it is possible by means of the coordination system to coordinate a global transaction, where alternative solution possibilities exist for its subtransactions, and that the combination of "2-phase-commitment"/"no 2-phase-commitment" is possible, too. It is guaranteed that exactly the necessary database transactions are committed, i.e. that for example neither two flights nor two hotels are bocked. Assuming that two airline databases have committed a flight at the same time, in ALT_WAIT of the help function WAIT_FOR_INDEPENDENT_PROCESS indeterministically a flight is selected (this will most likely be the process, whose PID was set fastest), and all other flight reservation processes are aborted. Assuming that two room reservation database transactions have reported "DB_READY" at the same time, the help function WAIT_FOR_DEPENDENT_PROCESS in its ALT_WAIT will also select indeterministically one of the processes reflecting this reservation and will cancel the other process, which triggers the sending of "DB_ABORT" to the corresponding hotel database.

If for a group of reservations (flight/hotel room/car) no solution is found, an abortion of the global transaction is called, which in turn causes the abortion of all successful reservations done so far, so that finally no reservation has been made at all.

In spite of all these properties, the transaction T guarantees the atomicity of the global transaction even in case of network failures. Whether atomicity is also guaranteed in case of system failures, depends on the distribution strategy, selected at creation time of the process identifier (PID) after the start of T. If the strategy is a reliable protocol ("RELIABLE"), in case of a system failure atomicity is guaranteed, too. Assuming that the site where the transaction T is running crashes after all processes have been started in parallel, and assuming that all processes run on other sites than the site where T is running, and that e.g. a hotel room reservation process (e.g. at hotel I) has already terminated successfully, now that the global transaction has been aborted by the crash, it must be guaranteed that the hotel room reservation is not made. At recovery of the coordination server at the site of T, the process identifier PID_Hotel I is found, and it is recognized that it is the PID of a dependent process, the transaction of which has been aborted. Therefore, the signal "ABORT" is automatically sent to this process, which triggers the "DB_ABORT" of the hotel room reservation. Assuming that a flight reservation has succeeded too, in the shown example no mechanism is provided which automatically triggers the reversion, like in case of the hotel room reservation. As flight reservations are compensatable, it is assumed that the user sends a reversion to the airline, if the check for the flight is received. However, it is not complicated to change the transaction T such in a way that in case of a flight reservation (i.e. via the database transaction which is controlled by an independent process) an abortion is done automatically if T is aborted. The required change of the example is to start flight reservations also as dependent processes (and to synchronize them by using the function WAIT_FOR_DEPENDENT_PROCESS), where the function C_RESERVATION is called unchanged.

The tunability concerning fault-tolerance is thus easily controllable via the selection of the distribution strategy used. Moreover, it is easy to change the semantics of the example according to other requirements. Usually the modification of a few lines is sufficient; this can be justified by the power of the control mechanisms supported by the coordination system.

The shown transaction T can be used as a component (i.e. as subtransaction) in other transactions. It demonstrates the property of non-cascading compensation: if T has committed, T can be reversed only as an entire arrangement, i.e. if the enclosing transaction of T is aborted after T has succeeded, then the compensation action "reversal of the Paris trip" is called; thus the trip can be compensated, although the hotel room and car reservation subcomponents were not compensatable.

Table 5 below illustrates this reservation example by using a procedural pseudo notation.

TABLE 5

```
FUNCTION C_RESERVATION (DBS)
    CALL " RESERVATION" IN DBS
    IF RESERVATION WAS SUCCESSFUL:
        IF DBS SUPPORTS A 2-PHASE-COMMITMENT: SEND
" DB_COMMIT" TO THE DBS
        DECLARE " RESERVATION REVERSAL IN DBS" AS
COMPENSATION ACTION IN THE CURRENT PROCESS
        CALL PROCESS TERMINATION WITH EXIT VALUE
" PREPARE"
    OTHERWISE: CALL PROCESS TERMINATION WITH EXIT
VALUE " ABORT"
FUNCTION NC_RESERVATION (DBS)
    CALL " RESERVATION" IN DBS
    IF RESERVATION WAS SUCCESSFUL (I.E. DBS HAS
REPORTED " DB_READY" ) :
```

TABLE 5-continued

```
    DECLARE " DB_COMMIT IN DBS" AS ON-COMMITMENT
ACTION IN THE CURRENT PROCESS
        START A SUBTRANSACTION T1 iN T
        DECLARE " DB ABORT IN DBS" AS COMPENSATION
ACTION IN T1
            COMMIT T1
        CALL PROCESS TERMINATION WITH EXIT VALUE
" PREPARE"
    OTHERWISE: CALL PROCESS TERMINATION WITH EXIT
VALUE " ABORT"
START TRANSACTION T
    CREATE NEW COMMUNICATION OBJECTS FOR THE
PROCESS IDENTIFIER PID_A, PID_B, PID_C, PID_H, PID_I,
PID_V, AND PID_W OF DISTRIBUTION STRATEGY PRY
        START INDEPENDENT PROCESS (PID_A) AT THE SITE OF
AIRLINE A; WHICH CALLS THE FUNCTION C_RESERVATION
(A_DBS)
        START INDEPENDENT PROCESS (PID_B) AT THE SITE OF
THE AIRLINE B, WHICH CALLS THE FUNCTION
C_RESERVATION (B_DBS)
        START INDEPENDENT PROCESS (PID_C) AT THE SITE OF
AIRLINE C, WHICH CALLS THE FUNCTION C_RESERVATION
(C_DBS)
        START DEPENDENT PROCESS (PID_H) AT THE SITE OF
HOTEL CHAIN H, WHICH CALLS THE FUNCTION
NC_RESERVATION (H_DBS)
        START DEPENDENT PROCESS (PID_I) AT THE SITE OF
HOTEL CHAIN I, WHICH CALLS THE FUNCTION
NC_RESERVATION (I_DBS)
        START DEPENDENT PROCESS (PID_V) AT THE SITE OF CAR
RENTAL COMPANY V, WHICH CALLS THE FUNCTION
NC_RESERVATION (V_DBS)
        START DEPENDENT PROCESS (PID_W) AT THE SITE OF CAR
RENTAL COMPANY W, WHICH CALLS THE FUNCTION
NC_RESERVATION (W_DBS)
    IF (WAIT_FOR_DEPENDENT_PROCESS (T, PID_A, PID_B,
PID_C) = " OK" ) AND
        (WAIT_FOR_INDEPENDENT_PROCESS (T, PID_H, PID_I) =
" OK" ) AND
        (WAIT_FOR_INDEPENDENT_PROCESS (T, PID_V,
PID_W) = " OK" ) )
        DECLARE " PARIS TRIP REVERSAL" AS COMPENSATION
ACTION OF T
        CALL COMMITMENT OF T
        INFORM CLIENT ABOUT TRAVEL RESERVATION
OTHERWISE
        CALL ABORTION OF T
        INFORM CLIENT THAT THE TRIP WAS NOT BOOKED
FUNCTION WAIT_FOR_INDEPENDENT_PROCESS (T, PID1, PID2,
. . . )
    WAITING LIST IS SET TO THE PROCESS IDENTIFIERS PID1,
    PID2, . . .
LABEL:
    IF WAITING LIST IS EMPTY: RETURN " NOT OK"
    WAIT WITH ALT_WAIT FOR WAITING LIST: LET PID_I BE
THE FIRED PROCESS IDENTIFIER
    REMOVE PID_I FROM THE WAITING LIST
    IF PID_I CONTAINS " SUCCEEDED" :
        SEND SIGNAL ABORT TO ALL PROCESS IDENTIFIERS
ON THE WAITING LIST
        DECLARE " SEND SIGNAL COMMIT TO PID_I" AS ON-
COMMITMENT ACTION
            RETRRN " OK"
        OTHERWISE
            SEND SIGNAL ABORT TO PID_I
            GOTO LABEL_1
FUNCTION WAIT_FOR_DEPENDENT_PROCESS (T, PID1, PID2,
. . .)
    LET ThE WAITING LIST BE ThE LIST OF PROCESS
IDENTIFIERS PID1, PID2, . . .
LABEL:
    IF WAITING LIST IS EMPTY: RETURN " NOT OK"
    WAIT WITH ALT_WAIT FOR WAITING LIST: LET PID_I BE
THE FIRED PROCESS IDENTIFIER
    REMOVE PID_I FROM THE WAITING LIST
    IF PID_I CONTAINS " PREPARED" :
```

TABLE 5-continued

```
        CANCEL ALL PROCESS IDENTIFIERS IN THE WAITING
LIST WITH REGARD TO T
        RETURN " OK"
    OTHERWISE
        CANCELLATION OF PID_I WITH REGARD TO T
        GOTO LABEL_1
```

The invention was illustrated above by means of detailed examples. However, changes and modifications are possible within the scope of the present invention. Clearly the given function names are arbitrary, and the functions can also be changed in the control flow.

What is claimed is:

1. A peer-to-peer coordination system of distributed programs, services and data by using application programs in a network of computers where coordination servers (CoKe) are running which serve local software systems (LSYS), where shared objects are used as communication objects to exchange messages and transactions are used to realized communication, said communication objects being uniquely identified by object identification numbers (OID), and only processes processing a reference to a communication object are granted access to it via the corresponding local coordination server, with the local software systems being at least extended by functions for the control of transactions, for the creation, reading and writing of communication objects, and for the creation and supervision of uniquely identified processes, and with the communication objects being administrated by means of replication strategies, wherein all coordination servers have identical basic functionality for distributed object, transaction and process management, and taken together, form a global operating system, so that the network of computers operates like a single global super computer where the addition of new processes and sites is dynamic, at least some of the objects are updateable objects having a non-resettable logical time stamp and capable of storing data, wherein the updateable objects are coordinated by an optimistic concurrency control without utilizing explicit locks on the objects and further wherein the data of the updateable object is writeable on distributed peer nodes, the functions provided for the extension of the local software systems provide a transactional blocking read of the updateable object and the processes are granted access to passed communication objects where different consistency models are supported for an updateable object, and distribution strategies are provided for the administration of communication objects, with the application programs not depending on said distribution strategies, and which distribution strategies are selectable at least with respect to the recoverability or non-recoverability of communication objects and processes.

2. A system according to claim 1, wherein when choosing the respective distribution strategy, a basic strategy is selected in combination with additional, optional strategy flags.

3. A system according to claim 2, wherein the local software systems can be started by the corresponding coordination server.

4. A system according to claim 3, wherein communication objects, to which no locally running process possesses a reference any more, are automatically cleared by the corresponding coordination server or can be explicitly freed.

5. A system according to claim 4, wherein heterogeneous transactions or subtransactions are distributed to different sites (X, Y, Z) via the coordination servers which, taken together, behave as a global operating system.

6. A system according to claim 5, wherein a non-blocking transactional read is provided for updateable objects.

7. A system according to claim 5, wherein the writing into an object, the starting of a subtransaction, the distribution of part of a transaction to another site, the specification of a compensation action or of an on-commitment action are provided as transactional predicate.

8. A system according to claim 7, wherein an on-commitment action is started as a computation if it is sure that a transaction will commit.

9. A system according to claim 8, wherein among the functions for transactions a programmable backtracking of transactional operations, e.g. reading or writing of communication objects, is provided to be able to dynamically repair faults or failures in the transactions.

* * * * *